(12) United States Patent
DeRuyck et al.

(10) Patent No.: US 9,714,037 B2
(45) Date of Patent: Jul. 25, 2017

(54) DETECTION OF DRIVER BEHAVIORS USING IN-VEHICLE SYSTEMS AND METHODS

(71) Applicant: Trimble Navigation Limited, Sunnyvale, CA (US)

(72) Inventors: Jason DeRuyck, Farmington, MN (US); Brian R. McLaughlin, Medina, MN (US)

(73) Assignee: TRIMBLE NAVIGATION LIMITED, Sunnyvale, CA (US)

( * ) Notice: Subject to any disclaimer, the term of this patent is extended or adjusted under 35 U.S.C. 154(b) by 0 days.

(21) Appl. No.: 14/829,272

(22) Filed: Aug. 18, 2015

(65) Prior Publication Data

US 2016/0046298 A1  Feb. 18, 2016

Related U.S. Application Data

(60) Provisional application No. 62/038,711, filed on Aug. 18, 2014, provisional application No. 62/118,353, filed on Feb. 19, 2015.

(51) Int. Cl.
*G08B 23/00* (2006.01)
*B60W 40/09* (2012.01)
*G06K 9/00* (2006.01)
*B60W 40/08* (2012.01)

(52) U.S. Cl.
CPC ......... *B60W 40/09* (2013.01); *G06K 9/00845* (2013.01); *B60W 2040/0827* (2013.01); *B60W 2540/22* (2013.01); *B60W 2540/30* (2013.01); *B60W 2710/30* (2013.01)

(58) Field of Classification Search
CPC ............ B60W 40/09; B60W 2710/30; B60W 2540/22; B60W 2040/0827; B60W 2540/30; G06K 9/00845
USPC ....... 340/576, 435, 425.5, 439; 701/36, 206, 701/409, 32.9, 123, 33.3, 51, 29.5, 435, 701/425.5, 22
See application file for complete search history.

(56) References Cited

U.S. PATENT DOCUMENTS

| 2,978,971 A | 4/1961 | Eburn, Jr. |
| 3,528,524 A | 9/1970 | Birbanescu et al. |
| 3,689,695 A | 9/1972 | Rosenfield et al. |

(Continued)

OTHER PUBLICATIONS

Aggarwal et al., "Human Activity Analysis: A Review", ACM Computing Surveys, vol. 43, No. 3, Article 16, Apr. 2011, 43 pages.

(Continued)

*Primary Examiner* — Dhaval Patel
(74) *Attorney, Agent, or Firm* — Hollingsworth Davis, LLC

(57) ABSTRACT

A system includes a motion sensor system configured for deployment in a cab of a vehicle and to generate substantially in real-time a digital mapping of driver movement during operation of the vehicle. A computer is configured for deployment in the cab and coupled to the motion sensor system. A driver behavior detector is coupled to the computer and configured to detect a driver distraction event using the driver movement mapping. A communication device at the vehicle is configured to communicate an alert message to one or both of a user interface device in the cab and a remote system in response to the detected driver distraction event.

21 Claims, 25 Drawing Sheets

(56) References Cited

U.S. PATENT DOCUMENTS

| | | |
|---|---|---|
| 4,023,507 A | 5/1977 | Van der Lely |
| 4,110,792 A | 8/1978 | Long et al. |
| RE30,539 E | 3/1981 | Van der Lely |
| 4,277,804 A | 7/1981 | Robison |
| 4,365,268 A | 12/1982 | Allen et al. |
| 4,555,725 A | 11/1985 | Geiersbach et al. |
| 4,776,750 A | 10/1988 | Griswold, Jr. et al. |
| 4,892,345 A | 1/1990 | Rachael |
| 5,015,189 A | 5/1991 | Wenzinger, Jr. |
| 5,090,804 A | 2/1992 | Wong et al. |
| 5,191,370 A | 3/1993 | Bozzolato |
| 5,289,321 A | 2/1994 | Secor |
| 5,429,329 A | 7/1995 | Wallace et al. |
| 5,517,419 A | 5/1996 | Lanckton et al. |
| 5,530,421 A | 6/1996 | Marshall et al. |
| 5,637,871 A | 6/1997 | Piety et al. |
| 5,956,079 A | 9/1999 | Ridgley |
| 5,995,900 A | 11/1999 | Hsiao et al. |
| 6,133,851 A | 10/2000 | Johnson |
| 6,148,255 A | 11/2000 | Van der Lely |
| 6,259,475 B1 | 7/2001 | Ramachandran et al. |
| 6,288,362 B1 | 9/2001 | Thomas et al. |
| 6,426,704 B1 | 7/2002 | Hutchison |
| 6,433,683 B1 | 8/2002 | Robinson |
| 6,434,450 B1 | 8/2002 | Griffin, Jr. et al. |
| 6,491,417 B1 | 12/2002 | Haen et al. |
| 6,578,675 B2 | 6/2003 | Wilson et al. |
| 6,690,413 B1 | 2/2004 | Moore |
| 6,693,519 B2 | 2/2004 | Keirstead |
| 6,750,898 B1 | 6/2004 | Ishida et al. |
| 6,783,187 B2 | 8/2004 | Parsons |
| 6,927,694 B1 | 8/2005 | Smith et al. |
| 6,933,837 B2 | 8/2005 | Gunderson et al. |
| 6,970,772 B2 | 11/2005 | Radtke et al. |
| 7,006,129 B1 | 2/2006 | McClure |
| 7,102,665 B1 | 9/2006 | Chandler et al. |
| 7,142,098 B2 | 11/2006 | Lang et al. |
| 7,164,476 B2 | 1/2007 | Shima et al. |
| 7,171,769 B2 | 2/2007 | Schultz et al. |
| 7,176,958 B2 | 2/2007 | Jones |
| 7,184,074 B1 | 2/2007 | Jansen |
| 7,193,508 B2 | 3/2007 | Hill et al. |
| 7,195,267 B1 | 3/2007 | Thompson |
| 7,204,504 B2 | 4/2007 | Gehring et al. |
| 7,265,663 B2 | 9/2007 | Steele |
| 7,280,042 B2 | 10/2007 | Trela |
| 7,306,398 B2 | 12/2007 | Doran, Jr. |
| 7,342,486 B2 | 3/2008 | Tsukada et al. |
| 7,344,109 B1 | 3/2008 | Rezai |
| 7,358,851 B2 | 4/2008 | Patenaude et al. |
| 7,400,957 B2 | 7/2008 | Hofer et al. |
| 7,434,643 B2 | 10/2008 | Lesesky et al. |
| 7,536,457 B2 | 5/2009 | Miller |
| 7,565,941 B2 | 7/2009 | Cunningham |
| 7,659,827 B2 | 2/2010 | Gunderson et al. |
| 7,660,433 B2 | 2/2010 | Dralle et al. |
| 7,725,216 B2 | 5/2010 | Kim |
| 7,804,426 B2 | 9/2010 | Etcheson |
| 7,825,951 B2 | 11/2010 | Lang et al. |
| 7,880,609 B2 | 2/2011 | Viegers et al. |
| 7,922,085 B2 | 4/2011 | Thomas et al. |
| 7,974,444 B2 | 7/2011 | Hongo |
| 8,000,843 B2 | 8/2011 | Kim |
| 8,004,112 B2 | 8/2011 | Koga et al. |
| 8,009,034 B2 | 8/2011 | Dobson et al. |
| 8,046,414 B2 | 10/2011 | Kamdar et al. |
| 8,120,653 B2 | 2/2012 | Schmidt et al. |
| 8,126,309 B2 | 2/2012 | Sakai |
| 8,139,820 B2 | 3/2012 | Plante et al. |
| 8,181,868 B2 | 5/2012 | Thomas et al. |
| 8,198,991 B2 | 6/2012 | Do |
| 8,199,975 B2 | 6/2012 | Pomerleau et al. |
| 8,232,871 B2 | 7/2012 | Lesesky |
| 8,239,092 B2 | 8/2012 | Plante et al. |
| 8,262,120 B1 | 9/2012 | Pitts et al. |
| 8,269,617 B2 | 9/2012 | Cook et al. |
| 8,276,322 B2 | 10/2012 | Miller |
| 8,314,708 B2 | 11/2012 | Gunderson et al. |
| 8,330,817 B1 | 12/2012 | Foster |
| 8,342,597 B2 | 1/2013 | Nagami et al. |
| 8,369,608 B2 * | 2/2013 | Gunaratne ......... G06K 9/00214 382/118 |
| 8,373,567 B2 | 2/2013 | Denson |
| 8,374,746 B2 | 2/2013 | Plante |
| 8,427,288 B2 * | 4/2013 | Schofield ................ B60C 23/00 340/425.5 |
| 8,500,383 B2 | 8/2013 | Schmidgall |
| 8,508,353 B2 | 8/2013 | Cook et al. |
| 8,564,446 B2 | 10/2013 | Gunderson et al. |
| 8,564,658 B2 | 10/2013 | Nimberger |
| 8,583,314 B2 | 11/2013 | de Oliveira et al. |
| 8,606,492 B1 | 12/2013 | Botnen |
| 8,626,568 B2 | 1/2014 | Warkentin et al. |
| 8,649,933 B2 | 2/2014 | Plante et al. |
| 8,670,035 B2 | 3/2014 | Robert |
| 8,676,491 B2 | 3/2014 | Taylor et al. |
| 8,680,976 B2 | 3/2014 | Lesesky |
| 8,725,345 B2 | 5/2014 | De Oliveira et al. |
| 8,744,642 B2 | 6/2014 | Nemat-Nasser et al. |
| 8,757,084 B2 | 6/2014 | Condit et al. |
| 8,849,501 B2 | 9/2014 | Cook et al. |
| 8,854,199 B2 * | 10/2014 | Cook ...................... G06Q 10/10 340/426.11 |
| 8,880,279 B2 | 11/2014 | Plante |
| 8,892,310 B1 | 11/2014 | Palmer et al. |
| 8,930,072 B1 | 1/2015 | Lambert et al. |
| 8,952,819 B2 | 2/2015 | Nemat-Nasser |
| 2002/0066621 A1 | 6/2002 | Wilson et al. |
| 2002/0080016 A1 | 6/2002 | Keirstead |
| 2002/0191407 A1 | 12/2002 | Haen et al. |
| 2003/0028298 A1 | 2/2003 | Macky et al. |
| 2003/0141965 A1 | 7/2003 | Gunderson et al. |
| 2003/0222982 A1 | 12/2003 | Hamdan et al. |
| 2003/0234512 A1 | 12/2003 | Holub |
| 2004/0021858 A1 | 2/2004 | Shima et al. |
| 2004/0041942 A1 | 3/2004 | Jones |
| 2004/0080206 A1 | 4/2004 | Parsons |
| 2004/0088090 A1 | 5/2004 | Wee |
| 2004/0196366 A1 | 10/2004 | Thiel |
| 2004/0212489 A1 | 10/2004 | Chan |
| 2005/0015805 A1 | 1/2005 | Iwamura |
| 2005/0102079 A1 | 5/2005 | Hofer et al. |
| 2005/0146607 A1 | 7/2005 | Linn et al. |
| 2005/0151845 A1 | 7/2005 | Tsukada et al. |
| 2005/0162513 A1 | 7/2005 | Chan |
| 2005/0193603 A1 | 9/2005 | Schultz et al. |
| 2005/0216294 A1 | 9/2005 | Labow |
| 2005/0219359 A1 | 10/2005 | Trela |
| 2005/0230163 A1 | 10/2005 | Cunningham |
| 2005/0242931 A1 | 11/2005 | Gunderson et al. |
| 2006/0061656 A1 | 3/2006 | Lang et al. |
| 2006/0092403 A1 | 5/2006 | Dralle et al. |
| 2006/0098094 A1 | 5/2006 | Lott |
| 2006/0147264 A1 | 7/2006 | Doran |
| 2006/0251502 A1 | 11/2006 | Scharfenberger |
| 2007/0120953 A1 | 5/2007 | Koga et al. |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0139182 A1 | 6/2007 | O'Connor et al. |
| 2007/0150373 A1 | 6/2007 | Kuo |
| 2007/0174624 A1 | 7/2007 | Wolosewicz et al. |
| 2007/0268158 A1 | 11/2007 | Gunderson et al. |
| 2007/0271105 A1 | 11/2007 | Gunderson et al. |
| 2008/0043736 A1 | 2/2008 | Stanley |
| 2008/0044061 A1 | 2/2008 | Hongo |
| 2008/0049830 A1 | 2/2008 | Richardson |
| 2008/0111666 A1 | 5/2008 | Plante et al. |
| 2008/0122603 A1 | 5/2008 | Plante et al. |
| 2008/0147267 A1 | 6/2008 | Plante et al. |
| 2008/0158352 A1 | 7/2008 | Schmidt et al. |
| 2008/0252417 A1 | 10/2008 | Thomas et al. |
| 2008/0304705 A1 | 12/2008 | Pomerleau et al. |

(56) References Cited

U.S. PATENT DOCUMENTS

| | | |
|---|---|---|
| 2008/0319602 A1 | 12/2008 | McClellan et al. |
| 2009/0057069 A1 | 3/2009 | Boggess |
| 2009/0102923 A1 | 4/2009 | Mason |
| 2009/0192638 A1 | 7/2009 | Leest et al. |
| 2009/0198415 A1 | 8/2009 | Tanaka et al. |
| 2009/0299805 A1 | 12/2009 | Baughman et al. |
| 2009/0309468 A1 | 12/2009 | Miller |
| 2009/0319341 A1 | 12/2009 | Berkobin et al. |
| 2010/0049994 A1 | 2/2010 | Ghoshal |
| 2010/0073473 A1 | 3/2010 | Nimberger |
| 2010/0085171 A1 | 4/2010 | Do |
| 2010/0157061 A1 | 6/2010 | Katsman et al. |
| 2010/0171828 A1 | 7/2010 | Ishii |
| 2010/0194976 A1 | 8/2010 | Smith et al. |
| 2010/0207744 A1 | 8/2010 | Lammers et al. |
| 2010/0225738 A1 | 9/2010 | Webster |
| 2011/0035777 A1 | 2/2011 | Chae et al. |
| 2011/0096166 A1 | 4/2011 | Englander et al. |
| 2011/0149077 A1 | 6/2011 | Robert |
| 2011/0163159 A1 | 7/2011 | Thomas et al. |
| 2011/0295446 A1 | 12/2011 | Basir et al. |
| 2012/0030041 A1 | 2/2012 | Wolosewicz et al. |
| 2012/0034056 A1 | 2/2012 | Schmidgall |
| 2012/0062741 A1 | 3/2012 | Stimel et al. |
| 2012/0146361 A1 | 6/2012 | Nagami et al. |
| 2012/0181878 A1 | 7/2012 | Nosaka et al. |
| 2012/0201312 A1 | 8/2012 | Schwager |
| 2012/0215403 A1 | 8/2012 | Tengler et al. |
| 2012/0277950 A1 | 11/2012 | Plante et al. |
| 2012/0318187 A1 | 12/2012 | Condit et al. |
| 2012/0330597 A1 | 12/2012 | Lammers |
| 2013/0021148 A1 | 1/2013 | Cook et al. |
| 2013/0024060 A1 | 1/2013 | Sukkari et al. |
| 2013/0069390 A1 | 3/2013 | Foster |
| 2013/0096731 A1 | 4/2013 | Tamari et al. |
| 2013/0107044 A1 | 5/2013 | Azevedo |
| 2013/0163825 A1 | 6/2013 | Shimura |
| 2013/0169425 A1 | 7/2013 | Victor et al. |
| 2013/0188050 A1 | 7/2013 | Winget |
| 2013/0197774 A1 | 8/2013 | Denson |
| 2013/0233448 A1 | 9/2013 | Schrubbe et al. |
| 2013/0274950 A1 | 10/2013 | Richardson et al. |
| 2013/0317711 A1 | 11/2013 | Plante |
| 2013/0332004 A1* | 12/2013 | Gompert ............... G07C 5/008 701/1 |
| 2013/0345927 A1 | 12/2013 | Cook et al. |
| 2014/0015977 A1 | 1/2014 | Taylor et al. |
| 2014/0025254 A1 | 1/2014 | Plante et al. |
| 2014/0046550 A1 | 2/2014 | Palmer et al. |
| 2014/0046569 A1 | 2/2014 | Mohn et al. |
| 2014/0047371 A1 | 2/2014 | Palmer et al. |
| 2014/0055569 A1* | 2/2014 | Jeon ................... H04N 13/0203 348/47 |
| 2014/0058616 A1 | 2/2014 | de Oliveira |
| 2014/0088824 A1 | 3/2014 | Ishimoto |
| 2014/0094992 A1 | 4/2014 | Lambert et al. |
| 2014/0139655 A1* | 5/2014 | Mimar ............... G08B 21/0476 348/77 |
| 2014/0152828 A1 | 6/2014 | Plante et al. |
| 2014/0167945 A1 | 6/2014 | Cook et al. |
| 2014/0195105 A1 | 7/2014 | Lambert |
| 2014/0210625 A1* | 7/2014 | Nemat-Nasser ..... B60K 28/066 340/575 |
| 2014/0236466 A1* | 8/2014 | Doron ................... G06Q 10/06 701/123 |
| 2015/0006278 A1* | 1/2015 | Di Censo ........... G06K 9/00845 705/14.43 |

OTHER PUBLICATIONS

Delaitre et al., "Recognizing human actions in still images: a study of bag-of-features and part-based representations", 2010, pp. 1-11.
Ke et al., "A Review on Video-Based Human Activity Recognition", Computers, 2013, pp. 88-131.
Kinect, Human Interface Guidelines v1.8, 2013, 142 pages.
Li et al., "Multi-Sensor Soft-Computing System for Driver Drowsiness Detection", 2012 Online Conference on Soft Computing in Industrial Application Anywhere on Earth, Dec. 10-21, 2012, pp. 1-10.
MacCormick, "How does the Kinect work?", retrieved from the internet on Oct. 13, 2014, 52 pages.
Munoz et al., "Detecting Fatigue in drivers by using 3D images", retrieved from the internet on Oct. 13, 2014, 6 pages.
Turaga et al., "Machine Recognition of Human Activities: A Survey", IEEE Transactions on Circuits and Systems for Video Technology, vol. 18, No. 11, Nov. 2008, pp. 1473-1488.
Axiomatic Global Electronic Solutions, "What is SAE J1939," www.axiomatic.com, Jul. 2006, 3 pages.
Britell et al., "Collision Avoidance Through Improved Communication Between Tractor and Trailer," Federal Register, vol. 59, No. 170, Sep. 2, 1994, pp. 45750-45752.
Corrigan, "Introduction to the Controller Area Network (CAN)," Application Report SLOA101A, Texas Instruments, Aug. 2002, 15 pages.
Fleet Camera Systems Fleet Safety, "In Vehicle Camera," www.safetytrackcam.com, printed on Jul. 16, 2014, 2 pages.
Junger, "Introduction to J1939," Vector Informatik GmbH, Application Note AN-ION-1-3100, www.vector.com, Apr. 27, 2010, 11 pages.
Lin et al., "Evaluation of the Power Line Motor Carrier Rearview Video System," State of Florida Department of Transportation, Jun. 2009, 147 pages.
Maryanka, "Using Power Line Communication for Harness Reduction in Automotive," Yamar Electronics Ltd, www.yamar.com, 2011, 4 pages.
SAE International, "The SAE J1939 Communications Network: An overview of the J1939 family of standards and how they are used," www.sae.org, 7 pages.
SAE International, "Surface Vehicle Recommended Practice," www.sae.org, 2004, 16 pages.
Safety Track's UCIT, Live Streaming Camera, SafetyTrackCam.com.

* cited by examiner

DETECTION OF DRIVER BEHAVIORS USING IN-VEHICLE SYSTEMS AND METHODS

RELATED PATENT DOCUMENTS

This application claims the benefit of Provisional Patent Application Ser. Nos. 62/038,711, filed on Aug. 18, 2014, and 62/118,353 filed on Feb. 19, 2015, to which priority is claimed pursuant to 35 U.S.C. §119(e), and which are incorporated herein by reference in their respective entireties.

TECHNICAL FIELD

This application relates generally to devices, systems, and methods pertaining to detection of driver behaviors.

SUMMARY

Embodiments of the disclosure are directed to a system comprising a motion sensor system configured for deployment in a cab of a vehicle and to generate substantially in real-time a digital mapping of driver movement during operation of the vehicle. A computer is configured for deployment in the cab and coupled to the motion sensor system. A driver behavior detector is coupled to the computer and configured to detect a driver distraction event using the driver movement mapping. A communication device at the vehicle is configured to communicate an alert message to one or both of a user interface device in the cab and a remote system in response to the detected driver distraction event.

Other embodiments are directed to a system comprising a motion sensor system configured for deployment in a cab of a vehicle and to generate substantially in real-time a digital mapping of driver movement during operation of the vehicle. An audio sensor is configured for deployment in the cab and configured to generate an audio signal responsive to driver movement during operation of the vehicle. A computer is configured for deployment in the cab and coupled to the motion sensor system and the audio sensor. A driver behavior detector is coupled to the computer and configured to detect a driver distraction event using the driver movement mapping and the audio signal. A communication device at the vehicle is configured to communicate an alert message to one or both of a user interface device in the cab and a remote system in response to the detected driver distraction event.

Further embodiments are directed to a method comprising generating substantially in real-time a digital mapping of driver movement during operation of a vehicle, and generating an audio signal responsive to driver movement during operation of the vehicle. The method also comprises detecting a driver distraction event using the driver movement mapping and the audio signal, and communicating an alert message to one or both of a user interface device in the vehicle and a remote system in response to the detected driver distraction event.

Some embodiments involve systems and/or methods for use with a vehicle comprising a tractor and a trailer. A system includes one or more image capture devices arranged to capture images of a driver. A driver behavior detector receives the captured images and additional information comprising at least one of driver information and vehicle information. The driver behavior detector analyzes the captured images in conjunction with the additional information and identifies one or more driver behaviors based on the analysis.

Some embodiments involve a system for detecting active driver behaviors, such as those involving the use of an electronic or other device. The system includes one or more image capture devices, each image capture device configured to capture images of a driver. A driver behavior detector is configured to analyze the captured images and to identify one or more active driver behaviors based on analysis of the captured images.

According to some embodiments, a driver behavior detector includes interface circuitry configured to receive captured images and additional information comprising at least one of stored driver information, current context information, and vehicle information. The driver behavior detector includes processing circuitry that analyzes the captured images in conjunction with the additional information and identifies one or more driver behaviors based on the analysis.

Further embodiments are directed to various methods implemented by systems of the present disclosure.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Driver behavior including fatigue-related behavior due to insufficient sleep, impaired ability due to drug and alcohol use, and active driver behaviors, such as texting, telephoning, watching videos, gaming, eating, etc., while driving can lead to unsafe driving and even an increase in traffic accidents. Embodiments disclosed herein involve capturing driver movement, and in some embodiments related audio data and/or other contemporaneous information, and using this data to identify various types of driver behaviors including fatigue-related behaviors and active behaviors including interaction by the driver with a device, such as an electronic device, e.g., cellphone, tablet, laptop computer, ebook reader, or a non-electronic device, such as a book, magazine, or newspaper.

Figure 1:
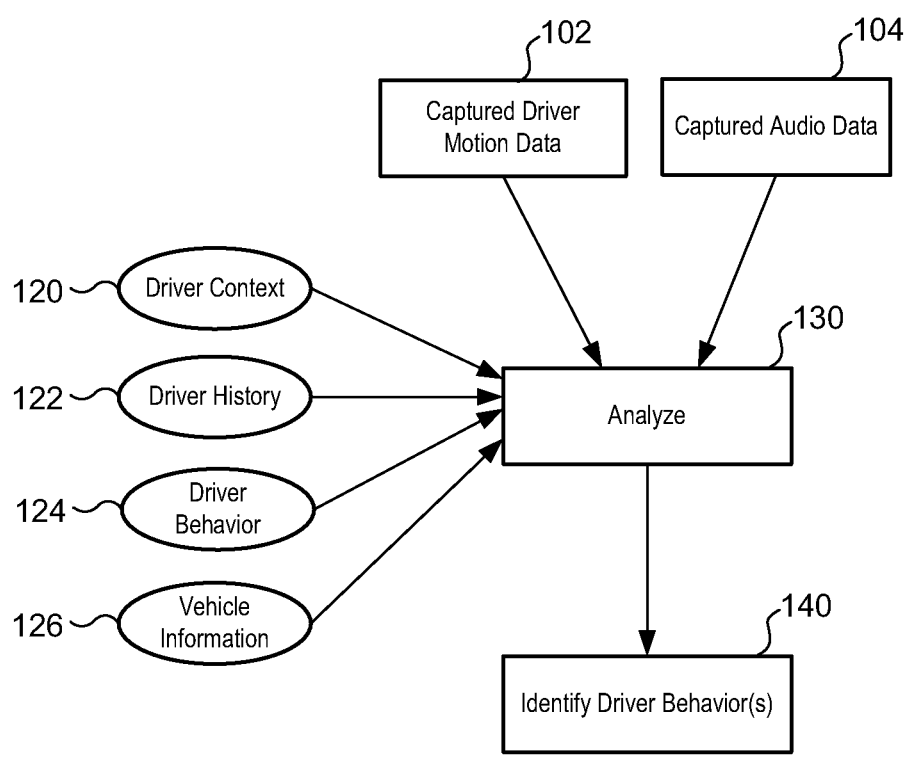
FIG. 1 is a conceptual diagram of an approach for identifying driver behaviors based on captured driver motion and audio data according to various embodiments.

FIG. 1 is a conceptual diagram of an approach for identifying driver behaviors based on captured driver motion and optionally audio data according to various embodiments. In some embodiments, driver motion within the cab of a vehicle is captured 102 using a motion sensor system that is positioned within the cab. In some implementations, the motion sensor system is positioned to capture motion of the driver's head and face, while in other implementations movement of the driver's torso, and/or driver's limbs and hands are also captured. Various embodiments involve capturing audio data 104 contemporaneously with the driver motion data. The audio data 104 can be captured by a microphone arrangement provided in the cab of the vehicle.

In some embodiments, the driver motion and audio data are analyzed 130 in conjunction with additional information that may include, but is not limited to, driver context 120, driver history 122, driver behavior 124, and/or vehicle information 126. The additional information may be acquired from a remote system, such as one that supports or is communicatively coupled to a transportation management system (TMS), or a multiplicity of remote systems or sources. The vehicle information 126 may include data acquired from the vehicle's computer or communication/network bus and/or one or more sensors (e.g., lane departure sensor, following distance sensor, roll stability sensor) provided in or on the vehicle. As discussed herein, driver context 120 involves a set of current conditions in which the driver is operating. For example, driver context conditions may include length of time that the driver has been on the road (e.g., hours of service (HOS) data), length of time since the driver last slept, weather conditions, temperature, heading direction, position of the sun, road conditions, date and time of day/night, traffic conditions, driver seatbelt usage, and/or any other current conditions that relate to and/or can influence driver behavior.

Driver history 122 includes historical information about the driver. For example, a driver's history may include years of experience, type of experience, history of traffic accidents, items from an employment personnel record, history of speeding and/or other traffic violations, number, severity, and length of previously identified occurrences of various driver behaviors. Severity of the previously identified occurrence of the driver behaviors may involve a rating of the potential danger of the occurrence, for example. In some embodiments, the system may collect and store a driving profile for a particular driver as part of a driver's history. For example, the driver's driving profile may include how quickly the driver accelerates or decelerates, usual speeds for particular driving conditions, e.g., night driving, driving in rain or snow, etc., how often the driver swerves or crosses the center line, and the like. The driver history 122 may include governmental CSA (Compliance, Safety, Accountability) scoring data in addition to other driver data.

Driver behavior 124 includes a profile, template, and/or a model that describes one or more attributes that are particular to the manner in which a specific driver behaves. Representative driver behaviors include the driver's normal blink rate, gaze direction, limb and/or torso position and/or movements, etc. If the driver's behavior deviates substantially from the driver profile/template or model, it may be more likely that the driver is engaging in an unusual (e.g., suspect) or unacceptable driver behavior. Embodiments of the disclosure are directed to systems and method for assessing driver behavior in real-time using onboard resources, and for providing real-time feedback (e.g., an alert, messaging, training) in response to detecting unacceptable driving behavior using onboard resources.

Vehicle information 126 relates to information about the operation of the vehicle and can be obtained from cameras and/or sensors attached to the vehicle and/or from the vehicle computer and/or other sensors. Vehicle information can include proximity of the vehicle to objects and/or other vehicles beside, behind, and/or in front of the vehicle, recent lane departure information, roll stability information, swerve information, sudden acceleration/deceleration, braking and/or shifting information, vehicle RPM, and/or vehicle speed, for example.

Driver motion data and contemporaneously related audio data are captured and analyzed 130, optionally in conjunction with the additional information, to identify 140 one or more driver behaviors. The captured driver motion and related audio data are analyzed and driver behavior identified by circuitry denoted herein as a "driver behavior detector." For example, the driver behavior detector may comprise hardware running software and/or firmware configured to implement driver behavior detection. In some embodiments, the driver behavior detector may be implemented as part of an onboard computer of a vehicle. In other embodiments, the captured driver motion and related audio data and optionally at least some of the additional information is transmitted from the vehicle to an external computer, e.g., the central office processor or TMS processor, which analyzes the captured driver motion and related audio data, optionally in conjunction with the additional data, to identify driver behaviors. In some embodiments, some portions of driver behavior detection, such as motion detection, image processing, and/or behavior recognition, classification, and detection, may be implemented by the vehicle's onboard system and some portions of the driver behavior detector such as analysis of the processed data, optionally in conjunction with additional data, may be implemented by an external processor. As such, some embodiments are directed to an onboard driver behavior detection system and method which is fully implemented using onboard resources, while other embodiments utilize at least some resources external to the vehicle.

In some embodiments, the detected driver behaviors are behaviors related to fatigue or falling asleep. These driver behaviors can be indicated by movements such as excessive yawning, blinking, and/or head nodding. In some embodiments, the driver behaviors are active behaviors (in contrast to fatigue-related behaviors), such as texting, emailing, using a cell phone, using a computer, gaming, web surfing, eating, grooming, reading, watching videos, etc. The active behaviors can be associated with the presence of a device and movements and/or positions that are consistent with interaction with the device. For example, movements/positions consistent with driver interaction with a device can include gaze directions, eye and/or retina movements, e.g., back and forth from road to device, finger/hand movements consistent with touch or keypad interaction, head rotations, e.g., alternately toward road and toward a device, etc.

Figure 2:
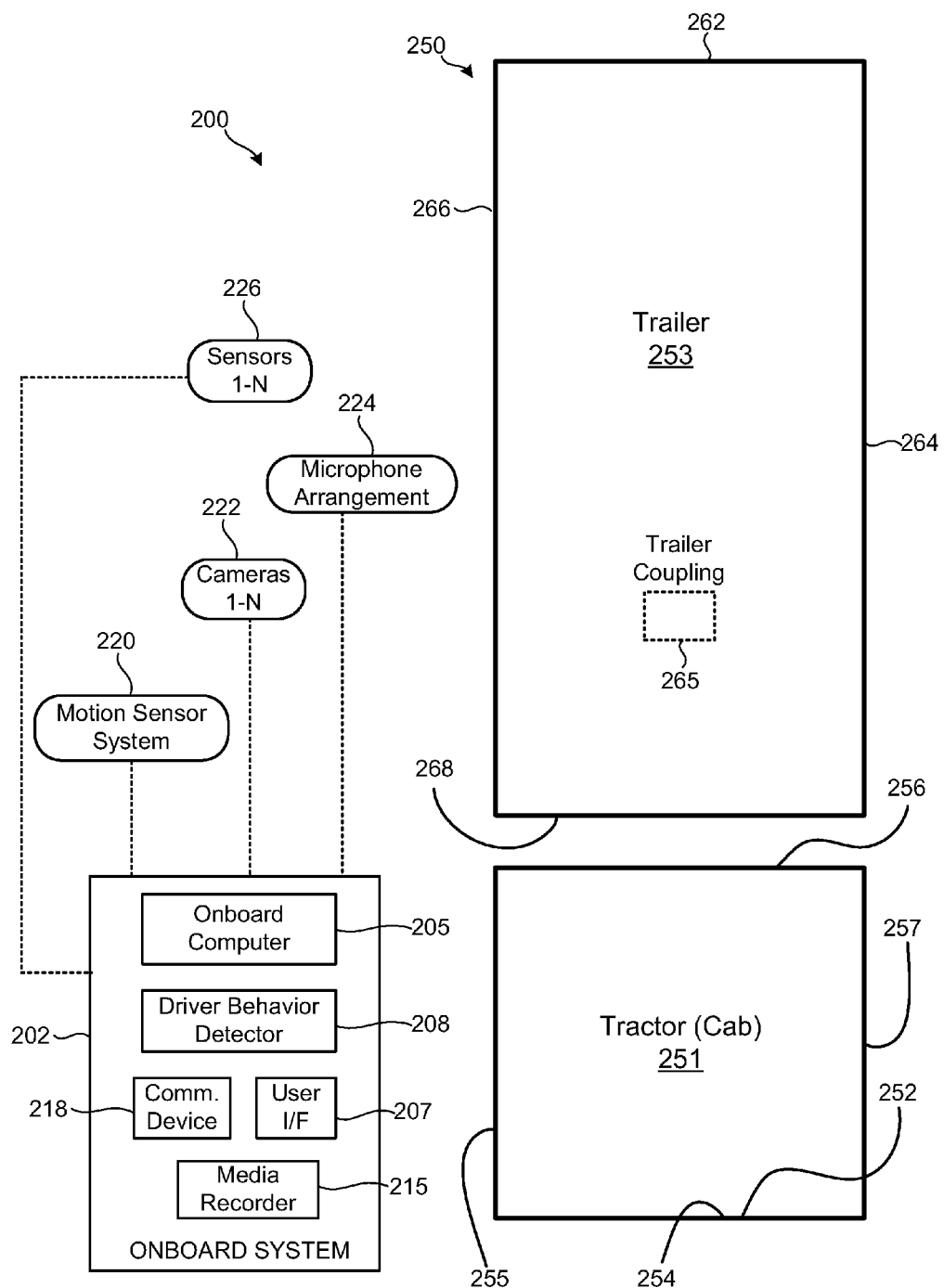
FIG. 2 is a block diagram of an apparatus for implementing embodiments that determine driver behavior in accordance with the disclosure.

FIG. 2 is a block diagram of an apparatus 200 for implementing embodiments that determine driver behavior in accordance with the disclosure. The apparatus 200 may be deployed on a vehicle 250 comprising a tractor 251 and a trailer 253 on which various electronic components are respectively mounted. The electronic components include an onboard system 202 which is preferably mounted in the tractor 251 of the vehicle 250. The onboard system 202 is shown to include an onboard computer 205 (which can include a microprocessor, controller, reduced instruction set computer (RISC), or other central processing module), a user interface 207, and a driver behavior detector 208. The user interface 207 includes one or more output devices and/or one or more input devices configured for interaction with an operator. The output devices may comprise an in-cab display (conventional or touch-screen) which can be mounted in the vehicle cab (e.g., fixedly or as a removable handheld device such as a table), one or more alert devices, e.g., auditory alert device, such as a speaker, a visual alert device, such as a blinking light or image on the display, a haptic alert device, e.g., a vibratory mechanism. The one or more input devices may comprise a keypad, function buttons, joystick, scrolling mechanism (e.g., mouse, trackball), touch pad/screen, or other user entry mechanisms. The onboard system further comprises a communication device 218, and a media recorder 215 (e.g., a digital video recorder). The onboard system includes a memory, which may be integral or coupled to a processor of the onboard computer 205, can store firmware, executable software, and algorithms, and may further comprise or be coupled to a subscriber interface module (SIM), wireless interface module (WIM), smart card, or other fixed or removable memory device/media.

The electronic components further include one or more cameras 222 (in some embodiments including in-cab cameras, such as a forward-looking/traffic viewing camera), a microphone arrangement 224 (at least one microphone or microphone array is located in the cab), and one or more sensors 226. The electronic components also include a motion sensor system 220, which is configured to capture driver movements. According to various embodiments, the motion sensor system 220 comprises a three-dimensional motion sensor configured to generate substantially in real-time a digital mapping of the driver's movement, such as head, eye, retina, torso, arm, and hand movement. In some embodiments, the motion sensor system is configured to generate a three-dimensional skeletal outline of one or more body parts of the driver, such as the driver's head, eye, retina, torso, arm or hand. The motion sensor system 220, cameras 222, microphones 224, and sensors 226 are communicatively coupled to the onboard system 202 via wired or wireless connections. It is understood that a given vehicle 250 may be equipped with some, but not necessarily all, of the data acquisition devices shown in FIG. 2 and that other data acquisition devices can be mounted to the vehicle 250 and coupled to the onboard system 202.

The various data acquisition devices illustrated in FIG. 2 can be mounted at different locations in, on, and/or around the trailer 253 and tractor 251 of the vehicle 250. All locations on the interior and exterior surfaces of the trailer 253 and tractor 251 are contemplated. According to various embodiments, the tractor 251 includes a cab in which the motion sensor system 220, microphones 224, and sensors 226 are mounted. For example, the motion sensor system 220 can be mounted on the dashboard 252 or on or adjacent the rearview mirror 254 (or elsewhere) and directed toward the driver's seat area so as to be able to capture driver movement while the driver is operating the vehicle 250. The motion sensor system 220 is mounted in the cab so that its field of view includes one or more of the driver's head, driver's face, driver's torso, and driver's limbs (e.g., hands). In some embodiments, the driver behavior detector 108 or other component may be configured to change the field of view of the motion sensor system 220 to facilitate capturing driver movement to identify driver behaviors. In some embodiments, a camera 222 can be positioned on the dashboard 252 or rearview mirror 254 (or elsewhere) and oriented in a forward-looking direction to view traffic ahead of the vehicle 250. A camera 222 may be mounted on the dashboard 252 or rearview mirror 254 (or elsewhere) and directed toward the passenger seat within the cab of the tractor 251.

The tractor 251 can include one or more exterior cameras 222, microphones 224, and/or sensors 226 according to various embodiments, such as a camera 222 mounted on a left side 257, a right side 255, and/or a rear side 256 of the tractor 251. The exterior cameras 222 can be mounted at the same or different heights relative to the top or bottom of the tractor 251. The trailer 253 can include any number of cameras 222 positioned in or on the various surfaces of the trailer 253. For example, a single or multiple (e.g., stereoscopic) cameras 222 can be positioned on a rear surface 262 of the trailer 253, allowing for driver viewing in a rearward direction of the vehicle 250. One or more cameras 222 can be positioned on a left and a right side surface 264 and 266 of the trailer 253, allowing for driver viewing in a rearward and/or lateral direction of the vehicle 250. One or more cameras 222 may be positioned on the front surface of the trailer 253, such as at a lower position to facilitate viewing of the hitch area and hose/conduit connections between the trailer 253 and the tractor 251. A camera 222 may also be situated at or near the trailer coupling location 265 or at or near other locations along the lower surface of the trailer 253, such as near fuel hoses and other sensitive components of the trailer 253.

Figure 3:
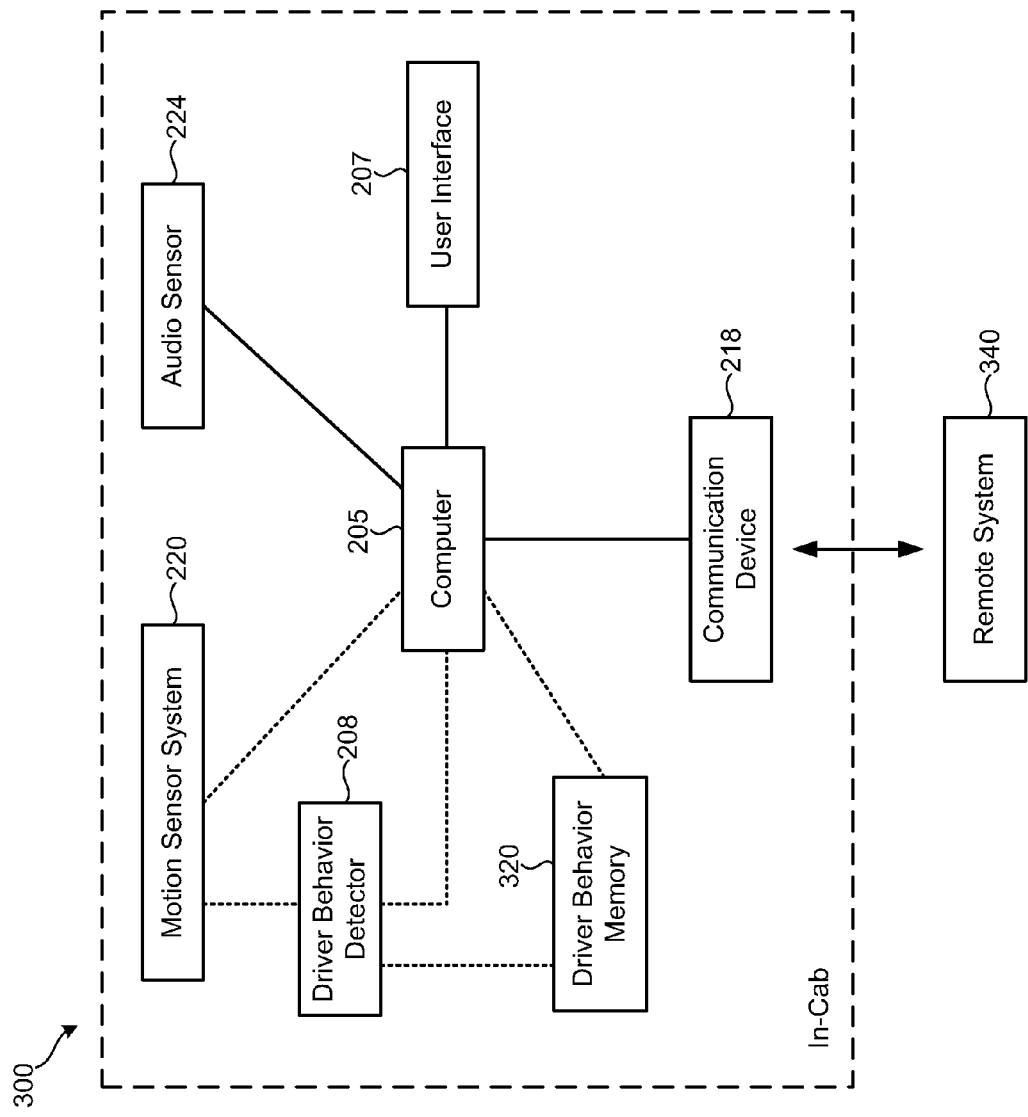
FIG. 3 illustrates a system for acquiring motion and audio information which is used to detect driver behavior in accordance with various embodiments.

Turning now to FIG. 3, there is illustrated a system 300 for acquiring motion and audio information which is used to detect driver behavior in accordance with various embodiments. The system 300 includes a motion sensor system 220 and an audio sensor 224, each of which is communicatively coupled to a computer 205, such as an onboard computer provided in a cab of the vehicle. The computer 205 may be implemented as a processing device integral or separate from an onboard computer provided at the vehicle. Also coupled to the computer 205 is a driver behavior memory 320 and a user interface 207. The driver behavior memory 320 can be configured to store one or more of a driver behavior profile, template, or model, as will be discussed in greater detail hereinbelow. The computer 205 is coupled to a communication device 218 which is configured to wirelessly communicate with a remote system 340. In some embodiments, the system 300 further includes a forward-looking motion sensor system configured for deployment in the cab and configured to sense substantially in real-time movement of a human located in front of the vehicle while the vehicle is in park. The forward-looking motion sensor system can be configured, for example, to generate substantially in real-time a skeletal mapping of the person moving in front of the vehicle while the vehicle is in park. Such embodiments can generate an alert when a person is passing in front of the vehicle while the vehicle is in park.

Figure 4:
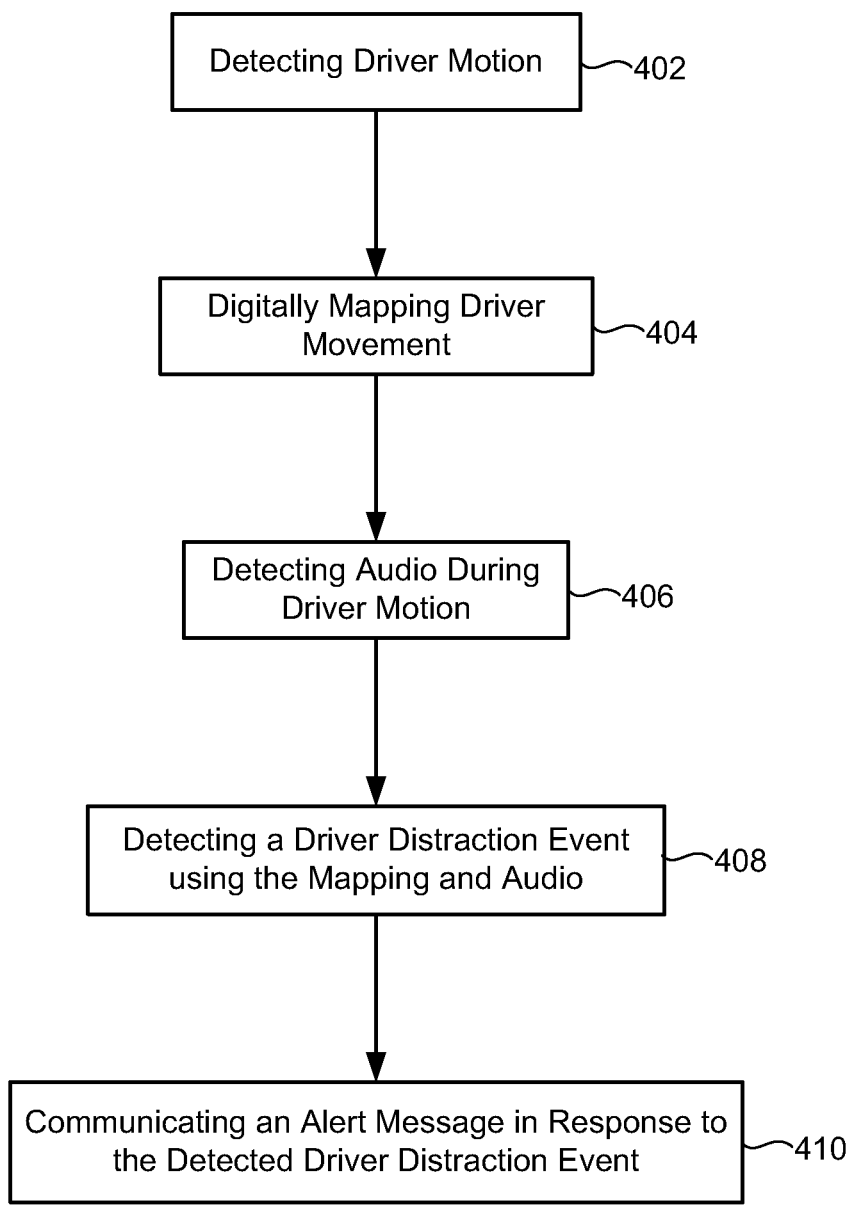
FIG. 4 illustrates a method of detecting driver behavior in accordance with various embodiments.

Referring to FIG. 4, there is illustrated a method of detecting driver behavior in accordance with various embodiments. The embodiment shown in FIG. 4 involves detecting 402 driver motion, and digitally mapping 404 driver movement based on the detected motion. The embodiment shown in FIG. 4 further involves detecting audio 406 during driver motion. Using the digital mapping and audio, a driver distraction event is detected 408. In response to detecting the driver distraction event, and alert response, such as a message, is communicated 410, such as within the vehicle cab and/or to a remote system. In some embodiments, an alert message communicated to the remote system comprises text and/or graphical data, but not camera or image data. It has been determined that driver acceptance of in-cab surveillance systems is significantly reduced where driver video or still images are captured and transmitted to a remote system for evaluation. Although embodiments of the present disclosure may use one or more cameras for detecting driver behavior and assessing vehicle operation, the camera data need not itself be transmitted to the remote system, but is instead used internally of the vehicle to evaluate driver behaviors. For example, some embodiments can be implemented to generate an alert message for transmission to a remote system that comprises an informational message devoid of photographic or video data as a requirement. In other embodiments, an alert message transmitted to the remote system can be devoid of photographic or video data but include a three-dimensional skeletal outline of the driver's face.

Figure 5:
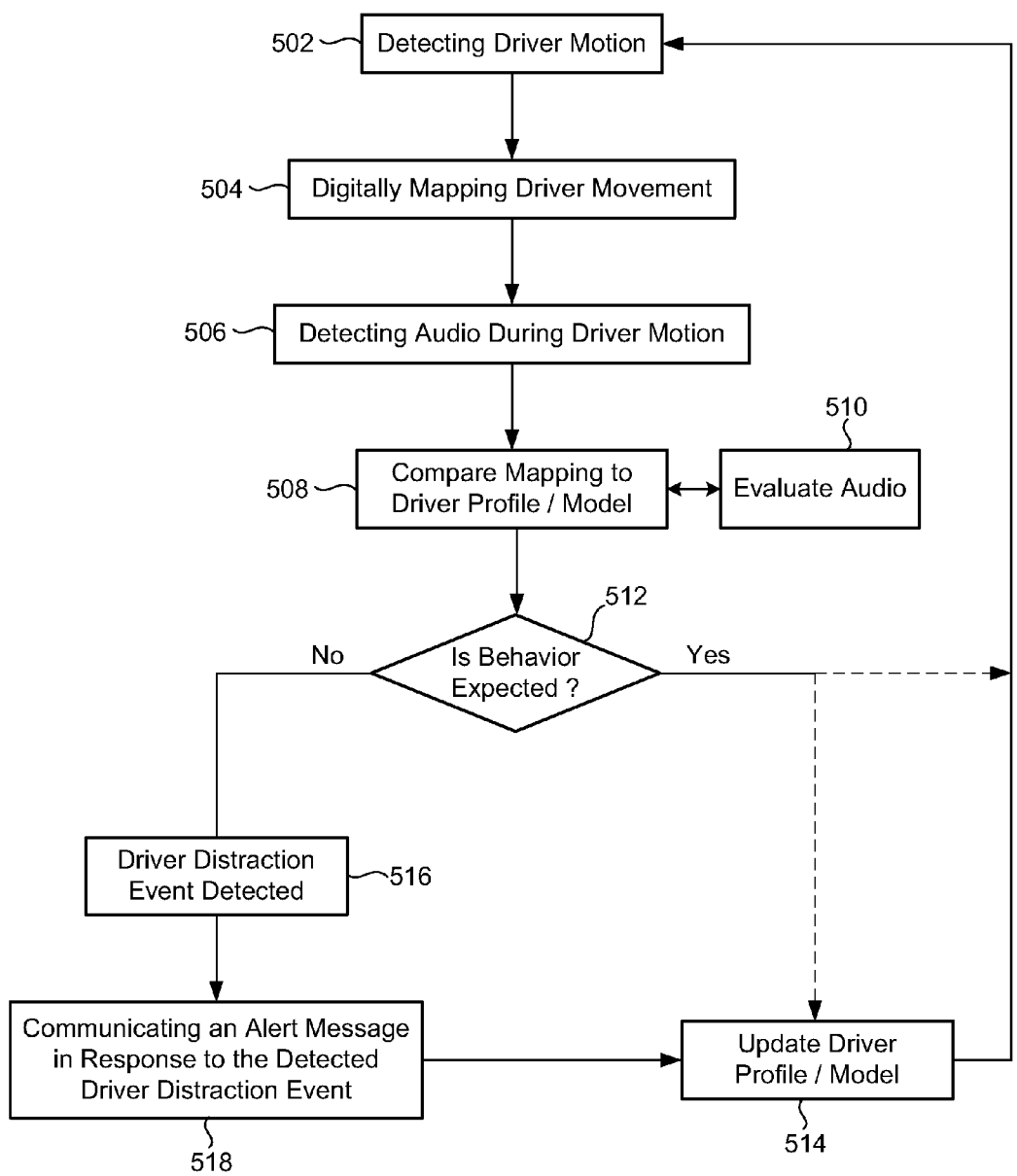
FIG. 5 illustrates a method of detecting driver behavior in accordance with various embodiments.

FIG. 5 illustrates a method of detecting driver behavior in accordance with various embodiments. The embodiment shown in FIG. 5 involves detecting 502 driver motion, digitally mapping 504 driver movement, and detecting 506 audio during driver motion. The embodiment also involves comparing 508 the digital mapping to a driver profile, template, and/or model. Audio, captured contemporaneously with the detected driver motion, is evaluated 510. The contemporaneous audio data provides additional information which can facilitate the determination of whether or not detected driver motion (based at least in part on the comparison 508) corresponds to acceptable or unacceptable behavior.

If the system determines that the detected driver motion corresponds to expected driver behavior 512, the system continues to detect for driver motion 502. In some embodiments, captured expected driver behavior can be used to update 514 the driver's personal profile, template, or model. If the system determines that the detected driver motion does not correspond to expected driver behavior 512, the system determines that a driver distraction event has been detected 516. In response to the detected driver distraction event, an alert response is generated, such as a message, and communicated 518 within the vehicle cab and/or to a remote system. It is noted that the system may take other remedial action, such as illuminating or sounding a visual or audible alarm/device within the cab, activating a tactile or haptic transducer that stimulates alertness by the driver, activates the driver's cell phone or PDA, and/or modifies vehicle operation (e.g., applies brakes, flashes lights, sounds horn). As a further response to detecting 516 a driver distraction event, the driver's profile, template, and/or model is updated 514, followed by continuance of driver motion detection 502.

Figure 6:
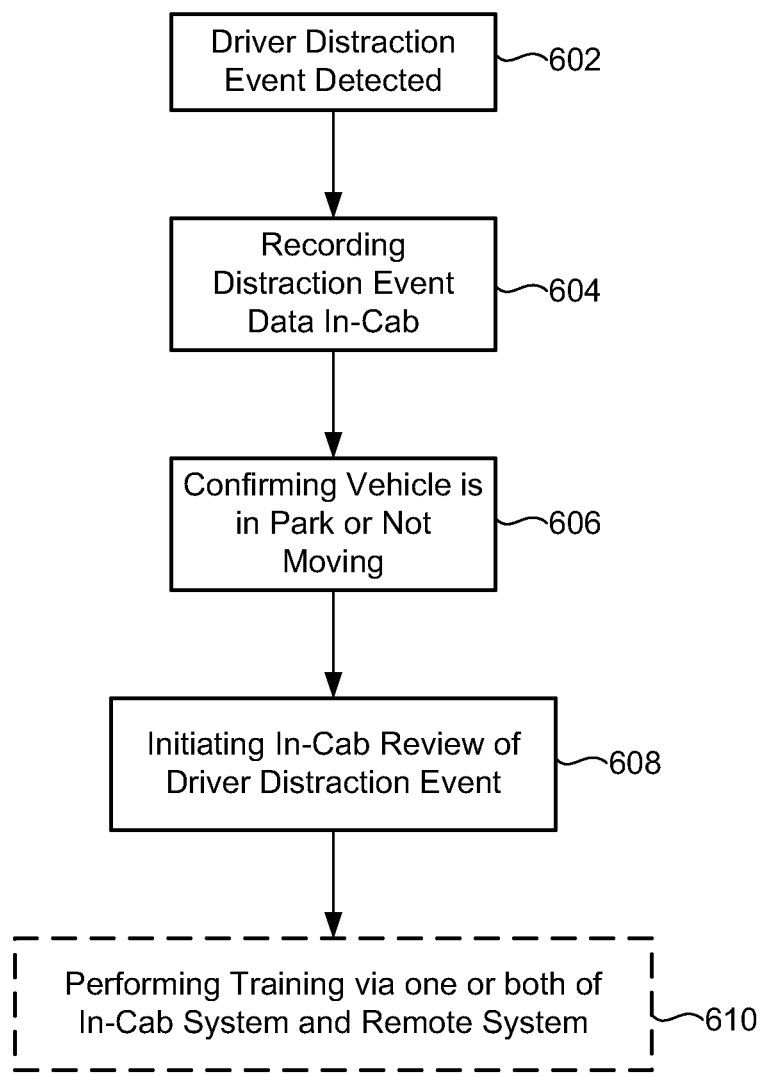
FIG. 6 illustrates a method of detecting driver behavior in accordance with various embodiments.

FIG. 6 illustrates a method of detecting driver behavior in accordance with various embodiments. In the embodiment shown in FIG. 6, a driver distraction event is detected 602 in a manner previously described. The driver distraction event is recorded 604 at the vehicle, such as by use of an in-cab media recording device. Various forms of data are recorded 604, including, but not limited to, digital mapping driver movement data, audio data, image data (e.g., motion video and/or still photos) acquired by one or more cameras within the cab, image data acquired by one or more cameras mounted in or on the tractor and/or trailer of the vehicle, vehicle computer and/or network data, and one or more sensors mounted to the vehicle. The recorded distraction event data can be communicated to a remote system and, as is described hereinbelow, used within the vehicle for enhancing driver safety and awareness.

Continuing with the methodology shown in FIG. 6, the system confirms 606 that the vehicle is in park or is in a non-moving state. The system initiates in-cab review 608 of the driver distraction event, such as presenting visual and textual information on a display within the cab and playing contemporaneous audio information through a speaker in the cab. The in-cab review 608 can be implemented solely by the onboard system or in conjunction with a remote system. The methodology shown in FIG. 6 can optionally involve performing driver training 610 via one or both of the onboard system and a remote system. Driver training 610 may involve real-time communication and review of pertinent acquired data with a trainer at a remote system location. Alternatively, driver training 610 may be solely conducted by the onboard system, which can include review of pertinent data acquired prior to, during, and after the detected driver distraction event.

Figure 7:
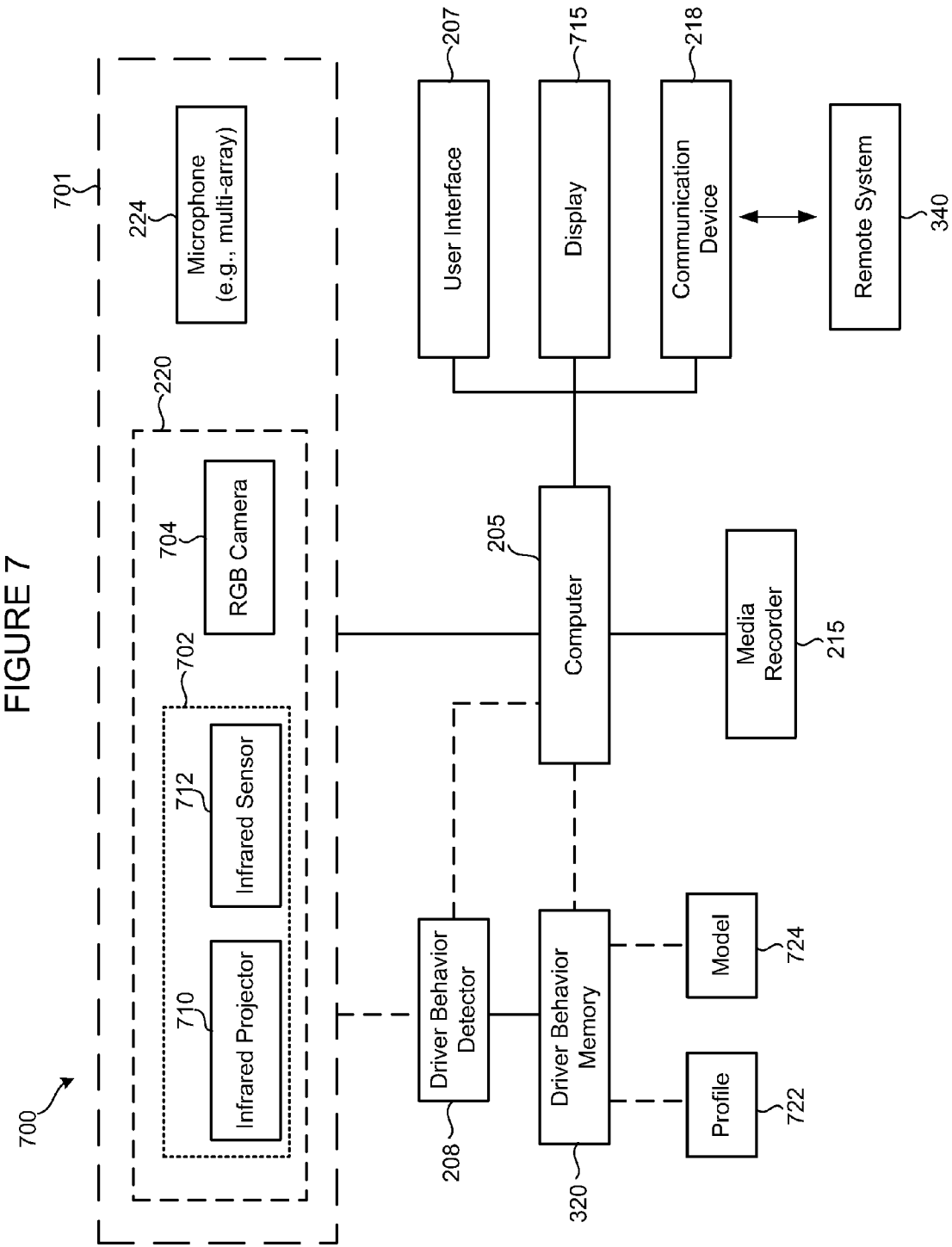
FIG. 7 illustrates a system for detecting driver behavior in accordance with various embodiments.

FIG. 7 illustrates a system for detecting driver behavior in accordance with various embodiments. The system 700 shown in FIG. 7 includes a driver movement sensor 701 which includes a motion sensor system 220 and a microphone arrangement 224. The driver movement sensor 701 is coupled to a computer 205, which can be a computer of an in-cab telematics system. Alternatively, or in addition, the driver movement sensor 701 can be coupled to a dedicated processor arrangement. The computer 205 is shown coupled to a user interface 207, a display 715, and a communication device 218 which facilitates wireless communication with the remote system 340. The computer 205 is also coupled to a media recorder 215, which can include a digital video recorder for example. Also coupled to computer 205 is a driver behavior detector 208 which interacts with a driver behavior memory 320. The driver behavior memory 320 is configured to store one or both of a driver profile 722 (also referred to as a template) and/or a driver model 724.

In some embodiments, the microphone arrangement 224 includes one or more independent microphones, while in other embodiments the microphone arrangement 224 includes a multi-array microphone (also referred to as a microphone array). The multi-array microphone 224 comprises a number (e.g., 4-24) of individual microphones (e.g., omnidirectional microphones) that can be supported on a common support structure or distributed around the cab of the vehicle. The multi-array microphone 224 may also be implemented with beamforming and adaptive steering technology to facilitate enhanced ambient noise rejection and/or locating of audio signal sources within the cab.

The motion sensor system 220 includes a motion sensor 702 and an RGB camera 704. The motion sensor 702 includes an infrared emitter (e.g., infrared laser projector) 710 and an infrared sensor (e.g., receiver or detector) 712. The RGB camera 704 is used to produce a color image of the driver's body or specified body parts. According to some embodiments, a Kinect® sensor (e.g., Kinect® for Windows®) or components of a Kinect® sensor can be used to construct the motion sensor system 200. The Kinect® Software Development Kit (e.g., SDK 2.0) can be used to integrate a Kinect® sensor as part of an in-cab driver movement sensing system according to various embodiments.

The motion sensor 702 is configured to determine a position and changes in position of the driver's body or specified body parts (e.g., yaw, pitch, roll of a body part, such as the driver's head or face). The motion sensor 702 can include its own processor or employ that of the computer 205. In some embodiments, the motion sensor processor and the computer 205 cooperate to detect driver movements and classify driver behavior based on the detected movements. Inferring driver body position (or body part position) is a two-stage process according to some embodiments. A first stage involves computing a depth map, and a second stage involves inferring body position based on the depth map. The motion sensor 702 is used to compute a depth map of the driver's body or body parts using structured light. For example, the motion sensor 702 can be configured to project a speckle pattern of infrared laser light onto the driver's body or body parts (e.g., face, torso, arms, hands). Deformation of the speckle pattern projected onto the driver's body is sensed and analyzed to compute depth information. Notably, neither the RGB camera 704 nor other camera that may be positioned within the cab is used for the depth computation according to various embodiments. In some embodiments, the response from the projection of structured light onto the driver is used with two known computer vision techniques, depth from focus and depth from stereo, to compute depth information.

Depth computations can be performed using available software and hardware, such as a 3D scanner and associated software provided by PrimeSense® (e.g., PrimeSense®'s Carmine and Capri sensors, and PrimeSense® NiTE Middleware). PrimeSense®'s NiTE Middleware, for example, represent suitable software that can analyze data from 3D scanner hardware, such as a PrimeSense® scanner, providing gesture and skeleton tracking. The software can identify the driver, track driver movements, and provide the framework API for implementing Natural-Interaction UI controls based on gestures. For example, the system can interpret specific driver gestures which may be considered unacceptable or dangerous behaviors, such as texting or otherwise interacting with a cell phone or other portable electronic device while driving the vehicle.

After the depth map has been computed by the processor of the driver movement sensor 701 or the computer 205, a machine learning algorithm is implemented to infer body position and changes to body position based on the depth map. According to some embodiments, body parts and the position of body parts is inferred using a randomized decision forest, learned from use of a multitude of training examples. Representative training examples include images of known skeleton orientations that are associated with suspect or unacceptable driving behavior. For example, training examples can include images of humans holding a cell phone at a distance from the face and images of the cell phone placed against the ear while in the sitting position. Training examples can include images of a sitting human interacting with a cell phone, such as reaching for and grasping the phone, moving the phone from an extended position to a position near or on the face, tilting of the head with the phone held to the ear, and interacting with the keypad using the fingers, etc. Examples of other training images include holding and/or manipulating a tablet, book or newspaper in a person's lap or on/near the steering wheel, and holding an object with two hands rather than one. Training images can be developed for a myriad of head orientations indicative of distracted driving. Other training images can be developed for different eye (e.g., squinting or closed) and mouth positions (e.g., yawning) that are indicative of distracted driving. A library of training examples for any number of suspect or unacceptable driving behaviors can be developed for a "generic" driver and then refined for particular drivers over time through actual use of the driver movement sensor 701 during vehicle operation.

According to some embodiments, the driver behavior detector 208 is configured to cooperate directly with the driver movement sensor 701. In other embodiments, the driver behavior detector 208 is configured to cooperate with the computer 205 which is coupled to the driver movement sensor 701. In either configuration, the driver behavior detector 208 is coupled to a driver behavior memory 320 which stores one or both of a driver behavior profile 722 and a driver behavior model 724. In some embodiments, a driver behavior profile 722 is supported in the driver behavior memory 320 and comprises a number of templates that can be representative of expected or unexpected driver behavior, depending on the particular implementation. According to some implementations, for example, the driver behavior profile 722 can include a large number of templates indicative of suspect or unacceptable driver positions, which can be compared against actual driver body positions detected by the motion sensor 702. If no template matches (e.g., within a predetermined tolerance or confidence factor) are found, then it is assumed that the actual driver behavior is acceptable. In other implementations, for example, the driver behavior profile 722 can include a large number of templates indicative of acceptable driver positions, which can be compared against actual driver body positions detected by the motion sensor 702. If no template matches are found, then it may be assumed that the actual driver behavior is suspect or unacceptable, typically when other corroborating information (e.g., vehicle data) also suggests undesirable driver behavior is occurring.

In some embodiments, a driver behavior model 724 is developed based on acceptable and unacceptable driver behaviors (e.g., driver body positions). A model 724 of acceptable and unacceptable driver behaviors, such as driver body positions, can be developed using images of such driver body positions. The driver behavior memory 320 stores images of both acceptable and unacceptable driver body positions according to some embodiments. A computer program or algorithm is implemented to determine whether an actual driver body position captured by the motion sensor 702 is more likely associated with acceptable or unacceptable driver behavior. In this regard, the computer program or algorithm produces a binary output of either acceptable or unacceptable driver behavior based on an input driver body position or range of body positions captured by the motion sensor 702.

According to some embodiments, a support vector machine (SVM) can be implemented to distinguish between acceptable and unacceptable driver behaviors based on input driver body position data captured by the motion sensor 702. An SVM can be configured to learn which driver behaviors are acceptable and which are unacceptable, and this active learning by the SVM can be used to refine the driver behavior model 724 over time. In this regard, the SVM is a behavior classifier, discriminating between acceptable and unacceptable or suspect driver behavior. SVMs can use outcomes from past driver behavior determinations and other data to predict whether a current driver behavior is likely to be acceptable or unacceptable. Those skilled in the art will understand that SVMs are implemented to determine the optimal hyperplane for linearly separable patterns, and can be extended to patterns that are not linearly separable by transformations of original data to map into new space. A driver behavior model 724 can be implemented using active learning by an SVM in accordance with various and known techniques, including those disclosed in U.S. Published Application Ser. No. 2004/0034612 which is incorporated herein by reference.

Figure 8:
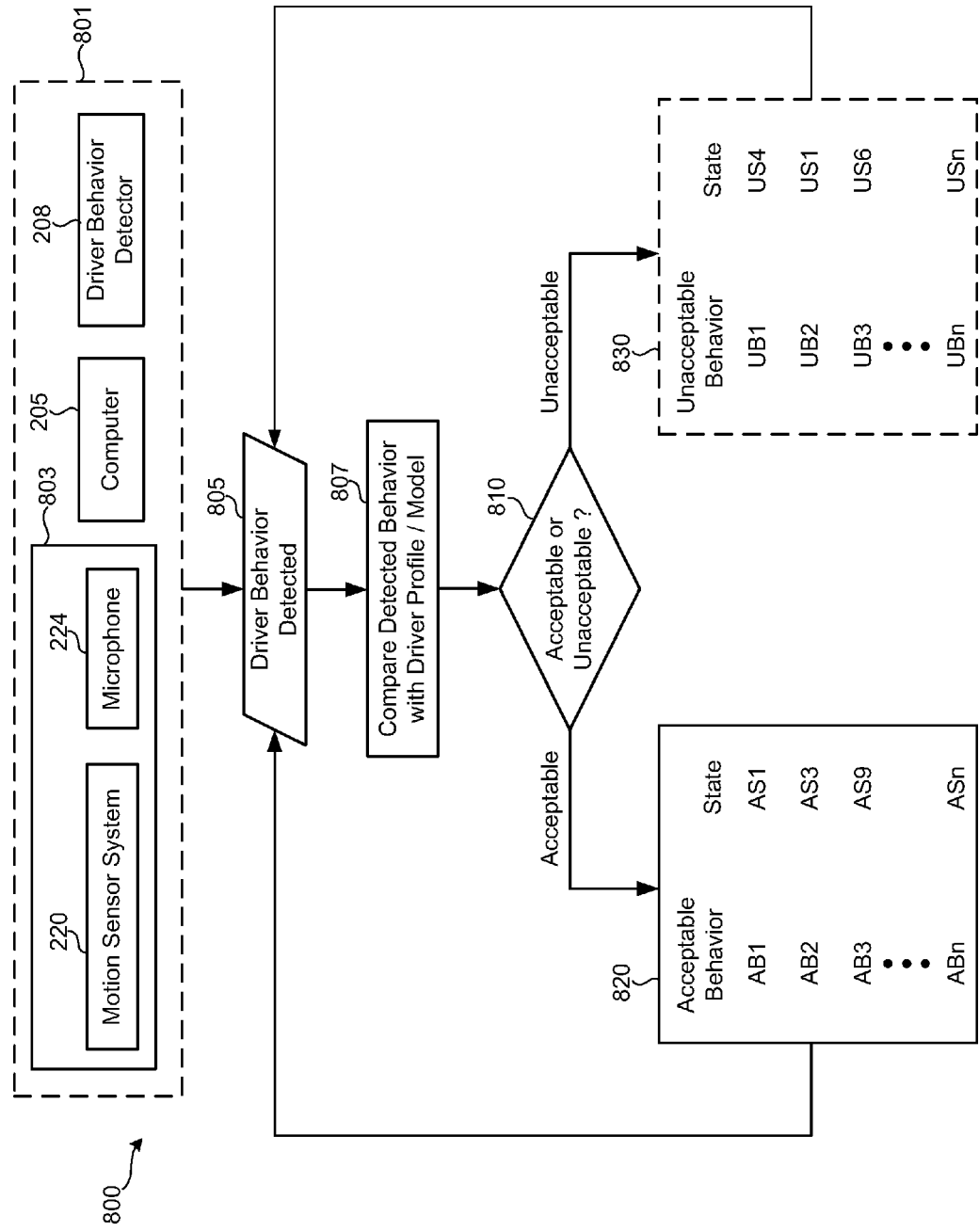
FIG. 8 illustrates a system which includes a driver movement sensor that operates in conjunction with a driver behavior profile or model to refine the profile or model over time in accordance with various embodiments.

FIG. 8 illustrates a system 800 that includes a driver movement sensor 801 that operates in conjunction with a driver behavior profile or model to refine the profile or model over time in accordance with various embodiments. The driver movement sensor 801 shown in FIG. 8 includes a motion sensor system 803 which comprises a motion sensor system 220 and microphone 224 (e.g., microphone array). The driver movement sensor 801 also includes a computer or processor 205 and a driver behavior detector 208. In response to detecting driver movement by the motion sensor system 803, the driver behavior detector 208 generates an output indicating that a driver behavior of interest has been detected 805. The detected driver behavior is compared 807 with a driver behavior profile or model 807, which may be either a generic profile/model or an individualized profile/model developed for a particular driver.

A determination is made as to whether the detected driver behavior is acceptable or unacceptable 810. If acceptable, a first profile or model 820 is updated with the currently detected driver behavior, so as to refine the first profile or model 820. For example, the first profile or model 820 includes a number of different acceptable behavior templates or models, such as AB1, AB2, . . . ABn. Each of the templates or models have an associated state, AS1, AS2, . . . ASn, indicating how many updates have been made to each template or model. For example, template or model AB1 is in initial state, AS1, which can be a default or a generic state. Template or model AB3 is in a more refined state, AS9, having been updated a total of nine times thus far in this illustrative example. It is noted that the first profile or model 820 of acceptable driver behavior is used in some embodiments (e.g., an SVM embodiment), while in other embodiments, the first profile or model 820 may be excluded.

If the detected driver behavior is unacceptable 810, for example, a second profile or model 830 is updated with the currently detected driver behavior, so as to refine the second profile or model 830. For example, the second profile or model 830 includes a number of different acceptable behavior templates or models, such as UB1, UB2, . . . UBn. Each of the templates or models have an associated state, US1, US2, . . . USn, indicating how many updates have been made to each template or model. For example, template or model UB1 has a state of US4, indicating that it has been updated a total of four times thus far. Template or model UB3 is in a more refined state, US6, having been updated a total of six times thus far in this illustrative example. With each iteration through the flow chart shown in FIG. 8, the driver behavior profile or model is improved through a learning mechanism implemented by the onboard system.

Figure 9:
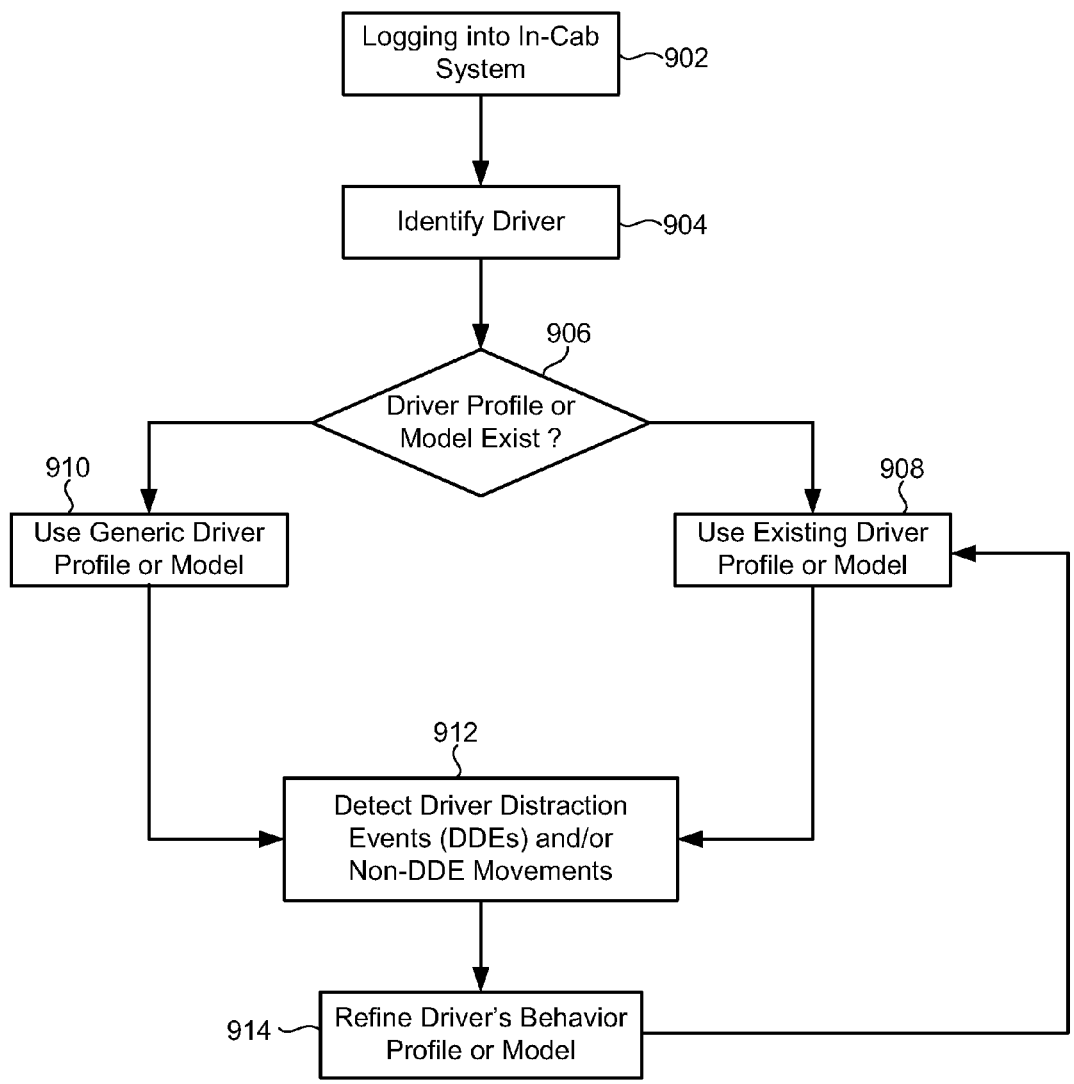
FIG. 9 is a flow chart showing various processes involving use of a driver behavior profile or model in accordance with various embodiments.

FIG. 9 is a flow chart showing various processes involving use of a driver behavior profile or model in accordance with various embodiments. The processes shown in FIG. 9 involve logging in 902 to the in-cab (on-board) system, and identifying the driver 904. The driver can be identified using several techniques, including one or a combination of taking a snapshot of the driver's face using an in-cab camera, such as the RGB camera of the onboard driver movement system, voice recognition, and user ID and password verification, among others. For example, the driver's facial image can be transmitted to the central office and used to verify the identity of the driver that is logging into the system. After identifying the driver, a check 906 is made to determine if a behavior profile or model exists for the now-identified driver.

In some cases, a behavior profile or model for a particular driver may already be available in the onboard system, in cases where the driver is operating the same vehicle or has operated the vehicle in the past. In cases were a behavior profile or model exists, the existing profile or model is accessed by the onboard system. The behavior profile or model stored in the onboard system is preferably also stored and maintained in a server at the central office. Because a particular driver may operate different vehicles, it is useful to have driver profiles/models maintained and updated at the central office. In this way, an aggregate driver profile or model can be maintained and refined over time at the central office. As such, an existing driver profile or model stored in the onboard system of a particular vehicle can be updated as part of the driver login procedure. In other cases, a behavior profile or model for a particular driver may not exist either in the onboard system or on the server at the central office. In such cases, a generic driver profile or model is used 910. The generic driver profile/model may already be available in the onboard system (e.g., as a default) or can be downloaded to the onboard system from the central office.

Using the pre-existing or generic driver profile or model available in the onboard system, driver distraction events (DDEs) are detected 912. In some embodiments (e.g., an SVM embodiment), non-DDE movements are also detected 912. The detected DDEs and, in some embodiments, the non-DDE movements, can be used to refine 914 a specific driver's behavior profile or model. It is noted that the generic driver profile or model can subsequently be redefined as the particular driver's personal driver profile model for current and future use.

Figure 10:
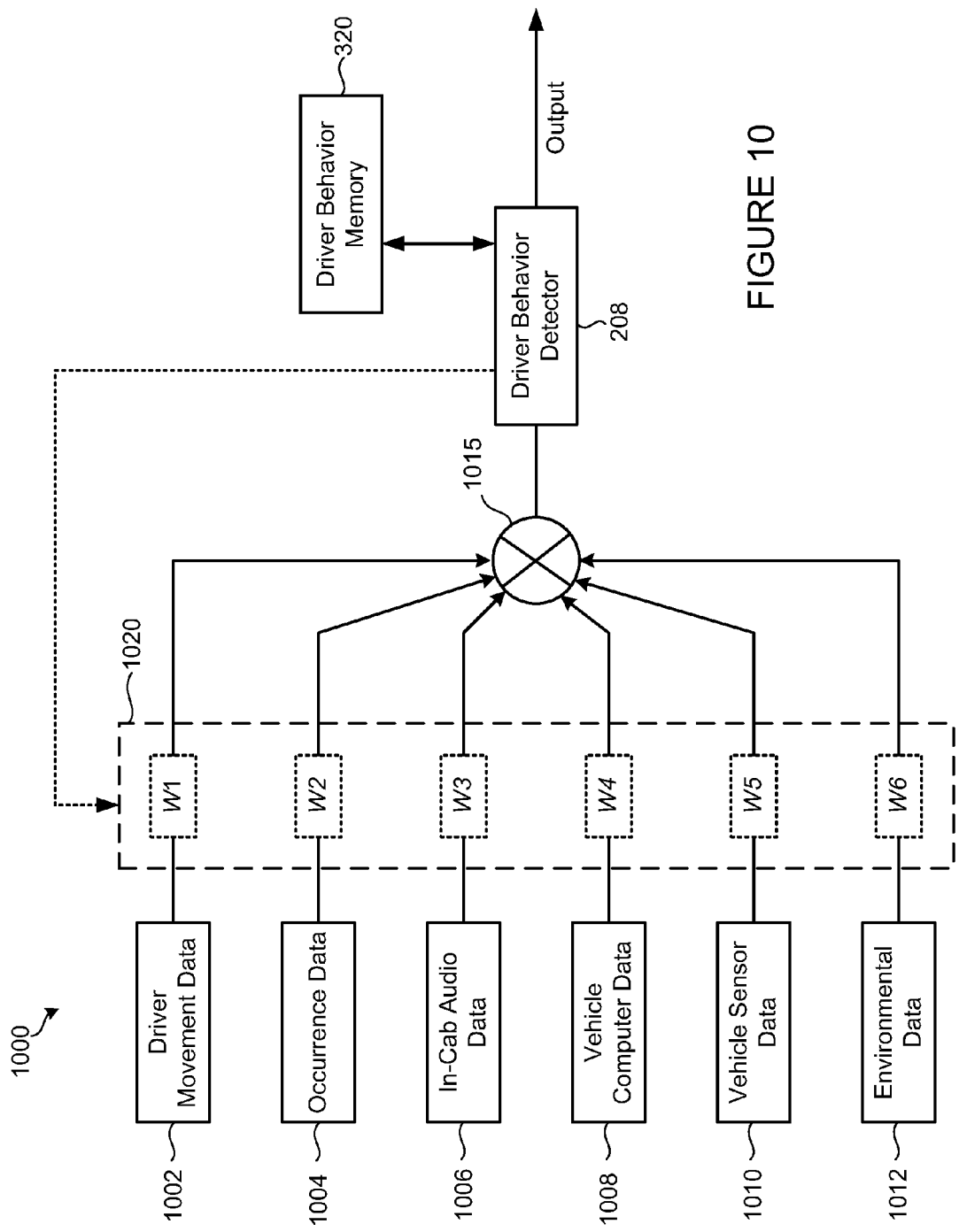
FIG. 10 illustrates an embodiment of a system for detecting driver behavior in accordance with various embodiments.

FIG. 10 illustrates an embodiment of a system for detecting driver behavior using a data fusion approach in accordance with various embodiments. The system 1000 shown in FIG. 10 accepts a number of data inputs from disparate sources in order to produce a determination of driver behavior with enhanced accuracy. In the embodiment shown in FIG. 10, a driver behavior detector 208 is coupled to a driver behavior memory 320 and receives input data from a summer 1015. The summer 1015 is coupled to the outputs of an array of weights (W1-W6) 1020. Each of the weights 1020 is configured to weight the output of one of the disparate data sources. In the illustrative example shown in FIG. 10, the disparate data sources include driver movement data 1002, occurrence data 1004 (e.g., number of times a particular driver movement or behavior is detected), in-cab data 1006, vehicle computer data 1008, vehicle sensor data 1010, and environmental data 1012. Each of the weights 1020 can be set at a value W ranging between 0 and 1.0 (e.g., 0% and 100%), for example. The values W of the weights 1020 can be initially set to a default value and refined over time based on experience by the driver behavior detector 208.

Figure 11:
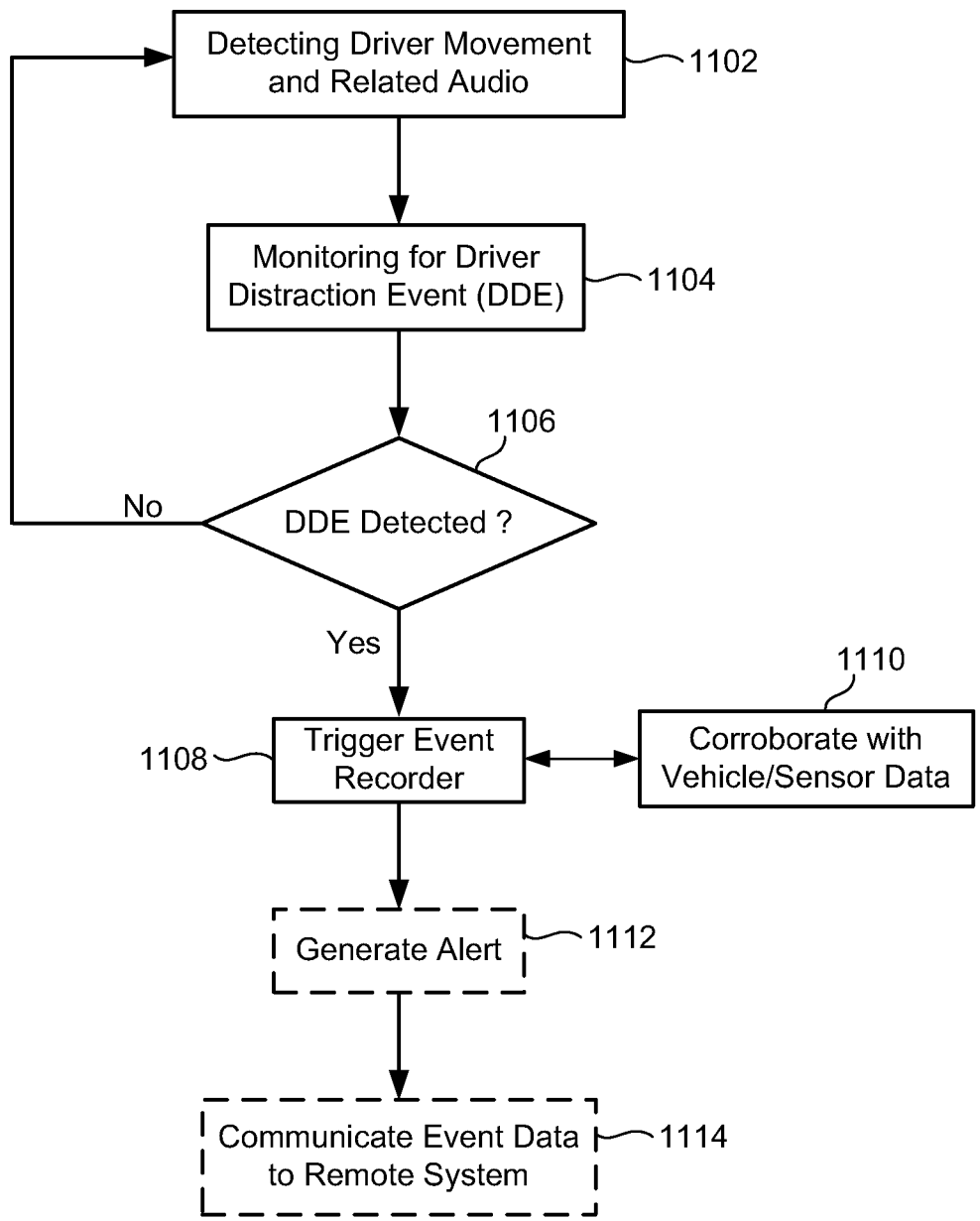
FIG. 11 illustrates a flow chart showing various processes involving driver behavior detection within the context of an onboard event detection methodology in accordance with various embodiments.

FIG. 11 illustrates a flow chart showing various processes involving driver behavior detection within the context of an onboard event detection methodology in accordance with various embodiments. The processes shown in FIG. 11 involve detecting 1102 driver movement and (optionally) related audio, and monitoring 1104 for a driver distraction event (DDE). If a DDE is detected 1106 based on detected driver movement and related audio if used, an onboard event recorder is triggered 1108. Triggering the event recorder can involve corroborating 1110 the occurrence of the detected DDE using vehicle and/or sensor data. In response to triggering the event recorder 1108, data before, during, and after the distraction event is recorded and an alert is generated 1112. The alert can be communicated to the driver and/or the remote system. Data associated with the DDE can be communicated 1114 to the remote system.

According to a related DDE monitoring embodiment, an in-cab audio sensor (e.g., microphone array) can be configured to operate in a listening mode, and the onboard computer can be configured to generate a trigger signal in response to an output of the audio sensor while operating in the listening mode. The audio sensor can be configured to detect audio signals indicative of suspect or unacceptable driver behavior, such as talking for extended periods of time indicative of cell phone usage or keystroke sounds indicative of keypad interaction. In response to the trigger signal, the motion sensor system is configured to generate substantially in real-time a digital mapping of the driver's face, and the driver behavior detector is configured to detect a DDE based on one or both of the digital mapping of the driver's face and the output of the audio sensor. According to this embodiment, the triggering input data source is the audio sensor and the corroborating input data source is the motion sensor system.

Figure 12:
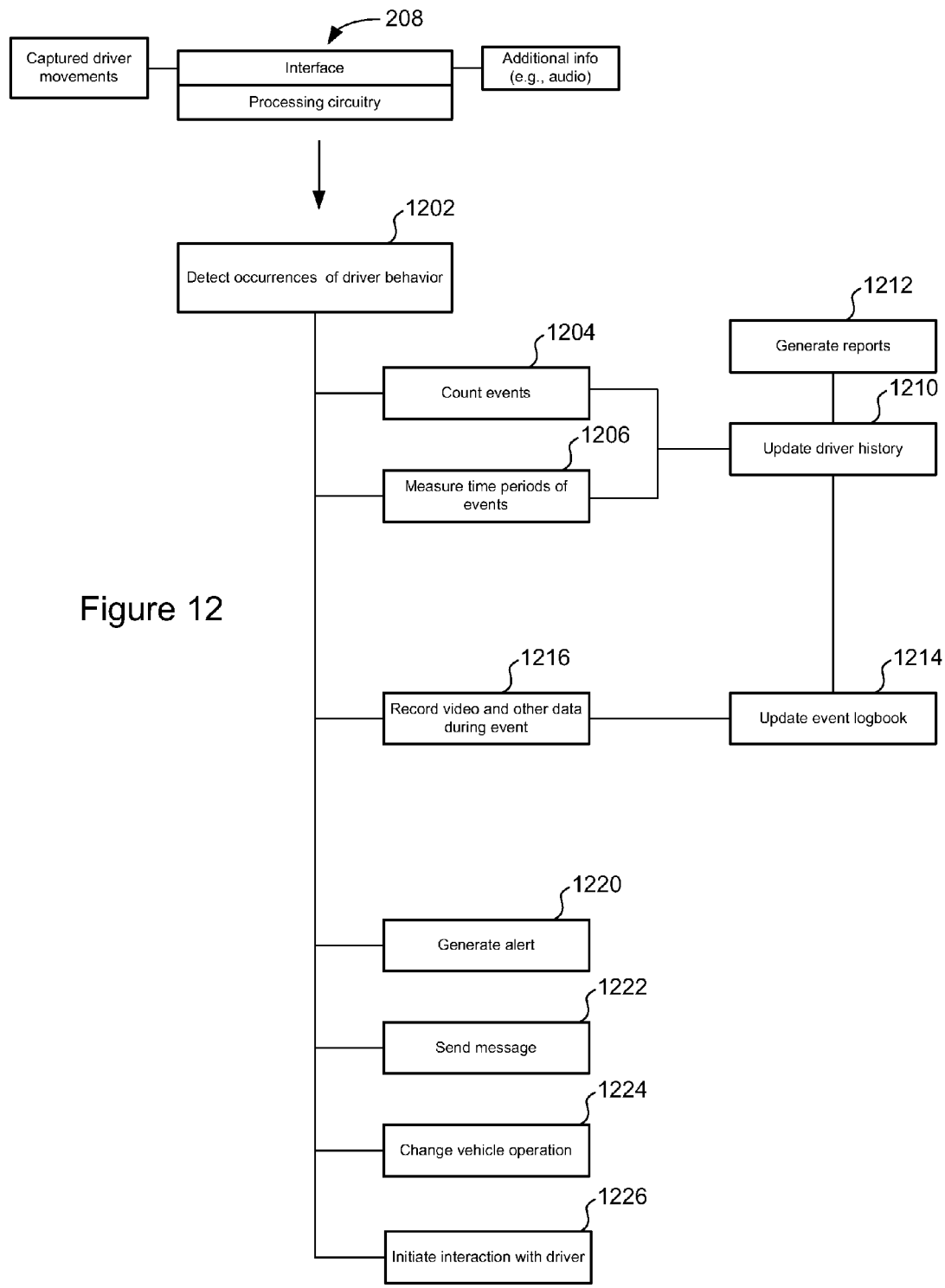
FIG. 12 is a diagram that conceptually illustrates operation of system that includes driver behavior detection in accordance with various embodiments.

FIG. 12 is a diagram that conceptually illustrates operation of a system that includes driver behavior detection in accordance with various embodiments. The system includes a driver behavior detector 208 configured to detect occurrences of a set of driver behaviors based on detected driver movements, and optionally contemporaneous audio and other information (e.g., captured images of an area surrounding the driver and/or the vehicle, contextual information, etc.), wherein the captured driver movements can be analyzed in conjunction with the optional additional information. The driver behavior detector 208 includes an interface configured to receive driver movement data from a driver movement sensor and to receive the additional information, e.g., driver history information, driver context information, and/or vehicle information. The interface can be configured to receive information from a variety of sources over a number of different types of interface schemes and/or protocols, e.g., serial and/or parallel bus, wireless and/or wired channels, etc. The driver behavior detector 208 further includes processing circuitry configured to analyze the detected driver movements in conjunction with the additional information and to detect 1202 driver behaviors based on the analysis.

An occurrence of driver behavior may be considered an event that extends over some time period. For example, a texting event may extend over a period of seconds or minutes. The system may optionally be configured to count 1204 the number of detected driver behavior events, e.g., total number of all types of driver behavior events and/or number of events for each type of detected event detected, etc. For example, and in accordance with some embodiments, an onboard computer can be configured to compare a digital mapping of driver movement generated by an in-cab motion sensor system to an expected behavior profile developed from previously acquired digital mappings of the driver's movements. The computer can be configured to count repeated occurrences where the digital mapping of driver movement matches the expected behavior profile, compare the count to a threshold, and determine that a potential driver distraction event is an actual driver distraction event in response to the count meeting or exceeding the threshold. The system may optionally be configured to measure 1206 the time period of each detected driver behavior event.

After a driver behavior event is detected, a driver history database can be updated 1210 with information about the recently detected event. For example, the count of driver behavior events for the driver can be incremented and information about the length and/or severity of the recently detected event can be stored. Information relating to the driver context and/or vehicle information during the driver behavior event can be stored and associated with the driver behavior event.

In some implementations, information about the driver behavior event can be summarized and stored in the driver history database in a summary format. The summarized information, e.g., date, time, type, duration, severity, for each detected event can be stored in an electronic driver behavior logbook that is updated 1214 for each detected driver behavior and is searchable by field, e.g., type of event, date, severity of event, etc. The driver behavior detector may control a media recorder configured to record video and/or store information and sensor data related to the detected driver behavior. Additional details of each occurrence of a driver behavior, including video, audio, and/or sensor information may be recorded 1216 and/or stored. In some embodiments, the logbook summary can be displayed to a user and the additional event details accessed using menus or links provided on the logbook summary screen. Information stored in the driver history and/or logbook can be used to generate 1212 reports for providing feedback to the driver and/or other users (e.g., located remotely at a central office) about detected driver behaviors.

Some driver behavior events result in dangerous conditions that require immediate feedback. For these types of events, the system may generate 1220 an alert, such as one or more of an auditory, visual, or haptic alert. In some embodiments, the system may send 1222 a communication of some type, e.g., SMS text message, email, automated telephone message, etc., to the driver and/or central office in response to detecting a driver behavior. In some embodiments, the system may change 1224 vehicle operation, for example, by slowing the vehicle, engage or disengaging cruise control, limiting the vehicle speed, initiating autopilot, e.g., guiding the vehicle by GPS and/or the vehicle cameras, disabling power to the vehicle, altering environmental controls in the cab, e.g., by one or more of changing air flow, lowering temperature, increasing radio volume and/or other modifications to the environment to make the driver less fatigued, honking the horn, and preventing the vehicle from starting and/or moving, among others.

In some embodiments, the system may initiate 1226 an interactive session with the driver. The interactive session may involve voice interaction that alerts the driver to the driver behavior and requests a voice response from the driver. In some scenarios, startling a driver with a harsh alert could be dangerous and a voice interaction, e.g., a voice telling the driver to wake up or pay attention and/or requesting a response, may be less startling to a fatigued driver. If the system does not receive the expected driver response, then another type of alert and/or a change in the vehicle operation may be initiated. In some implementations, the interactive session may continue until the driver stops the vehicle and/or takes one or more additional actions, e.g., breathalyzer, waiting period, sleep, contacting the central office, participating in a training, e.g., displayed over an in-cab display, stowing an electronic device, etc., before the system allows the vehicle to start or move. Additional information related to in-cab training is disclosed in U.S. Provisional Patent Application Ser. No. 62/038,725, filed Aug. 18, 2014, which is incorporated herein by reference.

Figure 13:
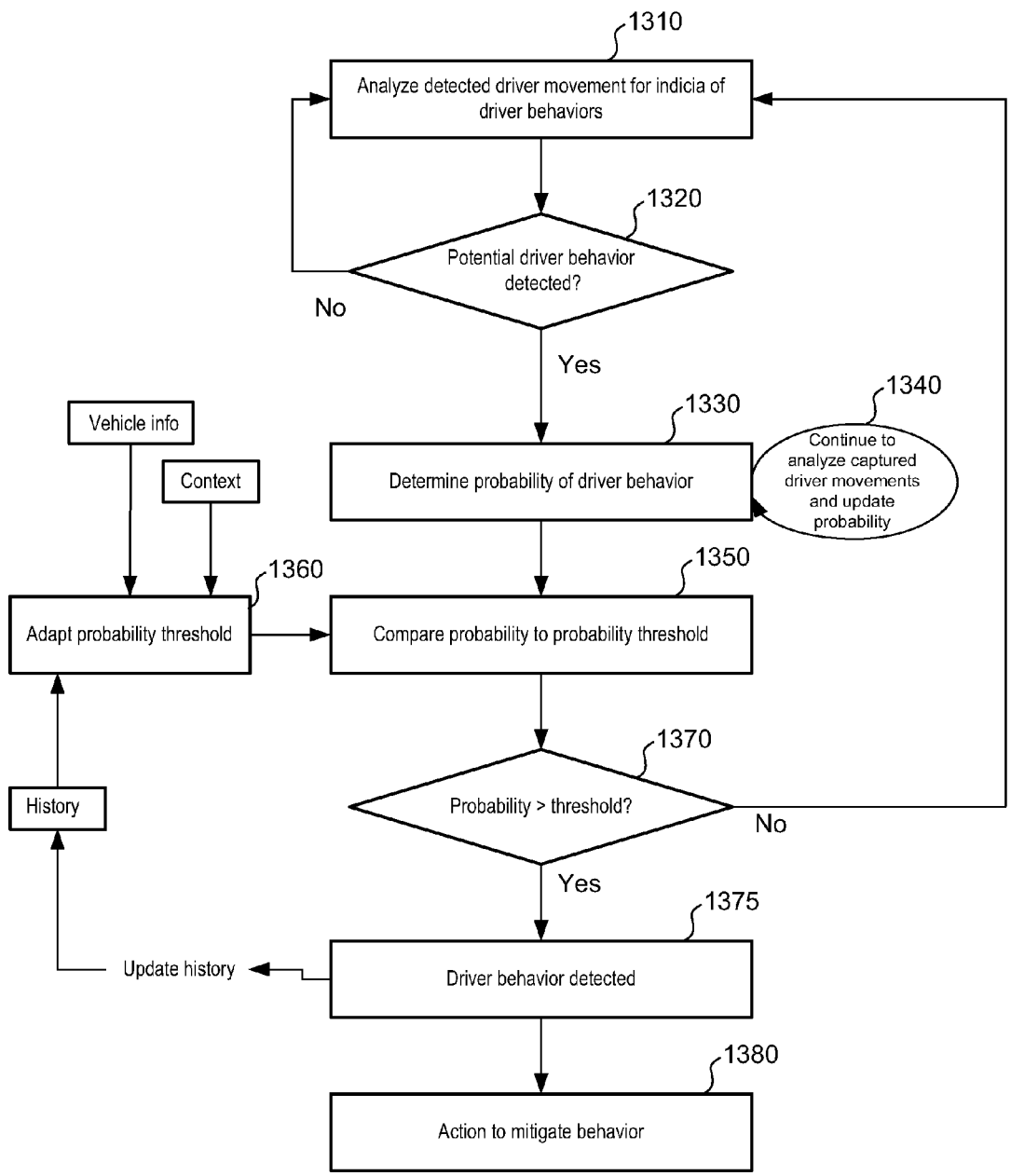
FIG. 13 is a flow diagram illustrating a method of identifying driver behaviors in accordance with various embodiments.

FIG. 13 is a flow diagram illustrating a method of identifying driver behaviors in accordance with various embodiments. Detected driver movements are continuously or periodically analyzed 1310 for evidence of one or more driver behavior events of interest. Evidence of a driver behavior event of interest in driver motion data or images can include, for example, driver movements that show an electronic device in view of, or being held by, the driver and driver positions and/or movements involving interaction with the electronic device. The driver movements may be head movements, e.g., head rotation downward or toward an electronic device, facial movements, gaze direction, e.g., eyes looking away from the road and/or toward the electronic device, torso movements and/or limb/hand movements, e.g., movements associated with gaming or texting.

If a potential driver behavior of interest is detected 1320, based on the analysis of the detected driver movements and optionally contemporaneous audio, a probability representative of confidence in the likelihood that the potential driver behavior is an actual driver behavior of interest is determined 1330. The system continues 1340 to analyze the captured driver movements and/or collects and analyzes subsequently acquired driver movements and continues to update the probability. The probability of the occurrence of the driver behavior event is compared 1350 to a threshold probability. The probability threshold can be determined and/or adapted 1360 based on one or more of driver history, vehicle information, driver context and/or previously detected and similar driver behavior. The system may confirm driver identity prior to accessing the driver history, e.g., by facial recognition based on the images captured by the RGB camera of the driver movement system or other camera in the cab if available.

In some embodiments, the vehicle information may influence the probability threshold. In some implementations, vehicle information can be obtained from one or more detection devices that are attached to the vehicle, such as one or more of a camera oriented to detect proximity of the vehicle to an object behind the vehicle, a camera oriented to detect proximity of the vehicle to an object beside the vehicle, a camera oriented to detect proximity of the vehicle to an object in front of the vehicle, a lane departure detector, a roll stability detector, swerve detector, and an acceleration/deceleration detector, and the like. In some implementations, the vehicle information can be obtained from the vehicle computer and may include one or more of braking information, gear shifting information, vehicle RPM, vehicle speed and/or other information obtained from the vehicle computer.

For example, if the vehicle information indicates accelerations and decelerations of the vehicle within a relatively short period of time, the probability threshold for a driver behavior may be decreased. In some embodiments, the context information may influence the probability threshold. For example, if the vehicle information indicates accelerations and decelerations of the vehicle within a relatively short period of time and the context information indicates that the vehicle is in an area of stop and go traffic, the probability threshold may not be decreased (e.g., may be increased). In contrast, if the vehicle is in a low traffic area, the probability threshold can be decreased. In some embodiments, if the recent operation of the vehicle does not substantially match the driver profile stored as part of the driver history, the probability threshold may be decreased.

If the probability of the driver behavior event is greater 1370 than the probability threshold, then a driver behavior (e.g., driver distraction event) is detected 1375. The driver history is updated to include information about the detected driver behavior. As previously discussed, the system may take action 1380 to mitigate the driver behavior, e.g. generate an alert, send a message, change vehicle operation, etc.

Table 1 below provides an example of some possible driver behaviors of interest arranged horizontally and movements/positions arranged vertically, with Xs in Table 1 indicating the relevant movements that indicate a particular behavior.

TABLE 1

DRIVER BEHAVIORS

| MOVEMENTS/POSITIONS | Fatigue | Texting, gaming, emailing, web surfing | Watching videos | Non-hands free telephoning | Reading | Eating |
|---|---|---|---|---|---|---|
| Yawning | X | | | | | |
| Blink rate | X | | | | | |
| Eyes closed | X | | | | | |
| Lateral head rotation | | X | X | | X | |
| Vertical head rotation | X | X | X | | X | |
| Hand movements | | X | | | | X |
| Hand position | | | | X | | |
| Eye position | | X | X | | X | X |
| Eye movements | | X | X | | X | X |
| Presence and location of device | | X | X | X | X | |

Detection of one or more of the movements/positions associated with a driver behavior of interest may not necessarily mean that the driver is engaging in that behavior. For example, the driver behavior detector may detect excessive blinking, e.g., blink rate greater than a threshold, without necessarily identifying fatigue. The driver behavior detector may be configured so that a driver behavior is identified based on a combination of several different types of movements that occur over a period of time. In contrast, some driver behaviors may be detected by a single movement, e.g., eyes closed continuously for a relatively short time can indicate that the driver has fallen asleep.

Various techniques for analyzing human activity from images have been studied and implemented, as referenced, for example, in *Human Activity Analysis, a Review*, Aggarwal, J. K., and Ryoo, M. S, ACM Computing Surveys, Vol. 43, No. 3, Article 16, and *Machine Recognition of Human Activities: A Survey*, Turaga, Paven et. al, IEEE Transactions on Circuits and Systems for Video Technology, Vol. 18, No. 11. Such techniques are useful for modeling and identifying both fatigue-related and active (non-fatigue related) driver behaviors. Techniques for identifying fatigue-related driver behaviors are described in U.S. Pat. No. 6,927,694 which is incorporated herein by reference in its entirety.

Figure 14:
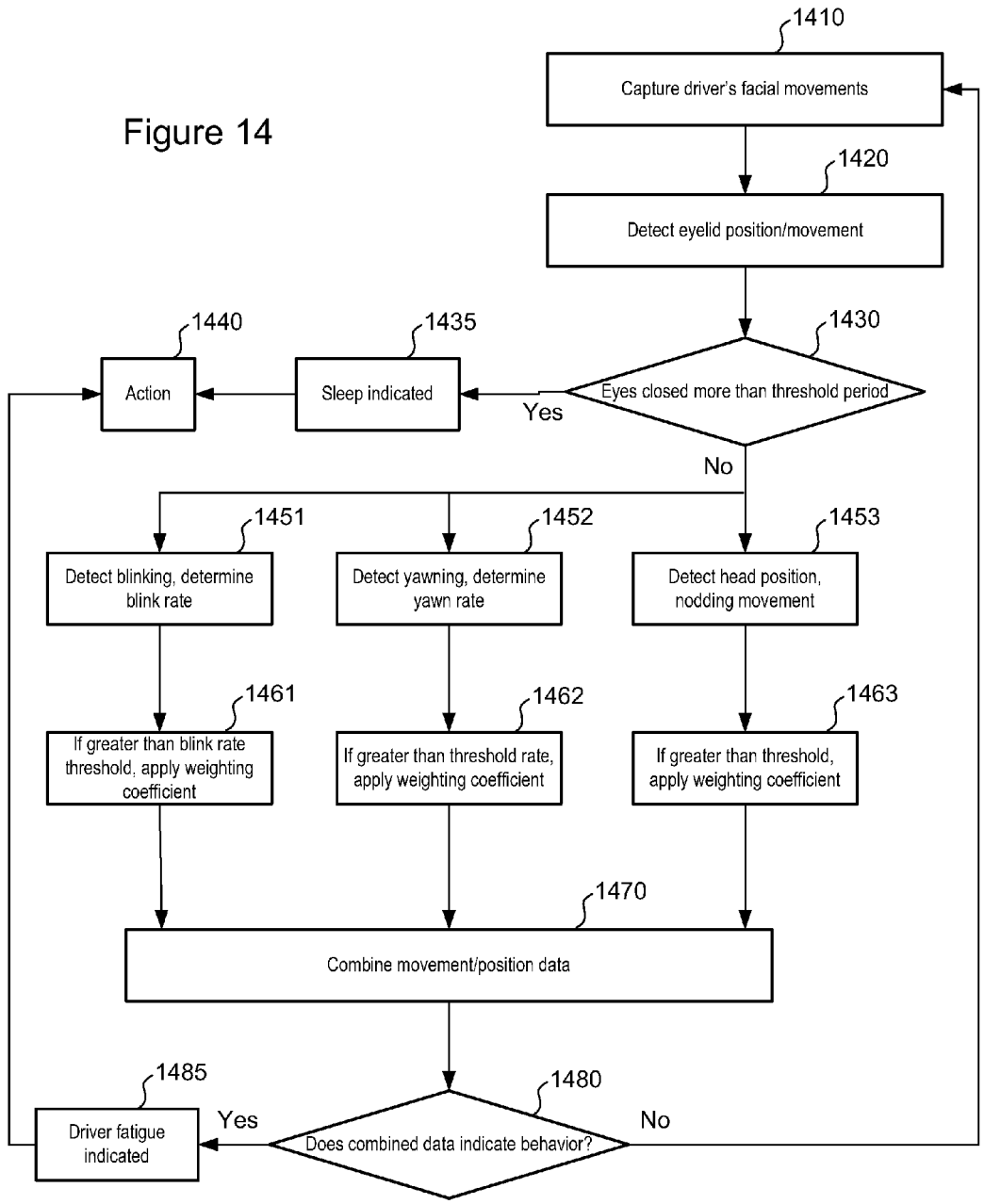
FIG. 14 is a flow diagram illustrating a process of detecting and responding to fatigue/sleep-related driver behaviors using a data fusion approach in accordance with various embodiments.

FIG. 14 is a flow diagram illustrating a process of detecting and responding to fatigue/sleep-related driver behaviors using a data fusion approach in accordance with various embodiments. Driver facial movements are captured 1410 by the driver movement sensor and analyzed 1420 for eyelid positions and movements. If eyelids remain closed 1430 for period of time greater than a threshold period, this is an indication that the driver is falling asleep 1435 and an alert 1440 is generated and/or other appropriate action is taken. Otherwise, if eyelids do not remain closed longer than the threshold period, the system checks for movements and/or positions related to fatigue, including blinking 1451, yawning 1452, and head movements/nodding 1453. Optionally, each of the movements/positions is associated with a weighting coefficient indicating the influence of the movement/position in making the driver behavior determination. Optionally, each of the movements/positions is associated with a confidence coefficient indicating a confidence that the movement/position was correctly detected.

In the representative example shown in FIG. 14, if blinking is detected 1461 at a rate greater than a threshold blink rate, then the blinking indicator is set to 1 and the weighting coefficient for blinking is applied. If yawning is detected 1462 at a rate greater than a threshold rate, then the yawning indicator is set to 1 and the weighting coefficient for yawning is applied. If head position/nodding is detected 1463 at a value greater than a threshold rate, then the head position/nodding indicator is set to 1 and the weighting coefficient is applied. The movement/position indicators may optionally be modified by a confidence coefficient that quantifies the confidence of correct detection of a particular movement/position. The movement/position indicators modified by their respective weighting factors and/or confidence coefficients are combined 1470 and are compared to an overall threshold value. If the combination of the movement indicators is greater than the overall threshold value, then the driver fatigue is indicated 1485 and appropriate action is taken 1440.

For example the combination of the movement/position data may be mathematically expressed:

$$f(x,y,z) = W_1 C_1 x + W_2 C_2 y + W_3 C_3 z,$$

where x, y, and z are variable indicators that represent blinking, yawning, and nodding, respectively, and can have values of 0 or 1, wherein 1 indicates that the movement is detected, and 0 indicates that the movement/position is not detected, $W_1$, $W_2$, $W_3$ are weighting factors associated the importance of the movement/position, and $C_1$, $C_2$, $C_3$ are confidence coefficients quantifying a confidence that the movement/position is present.

Figure 15:
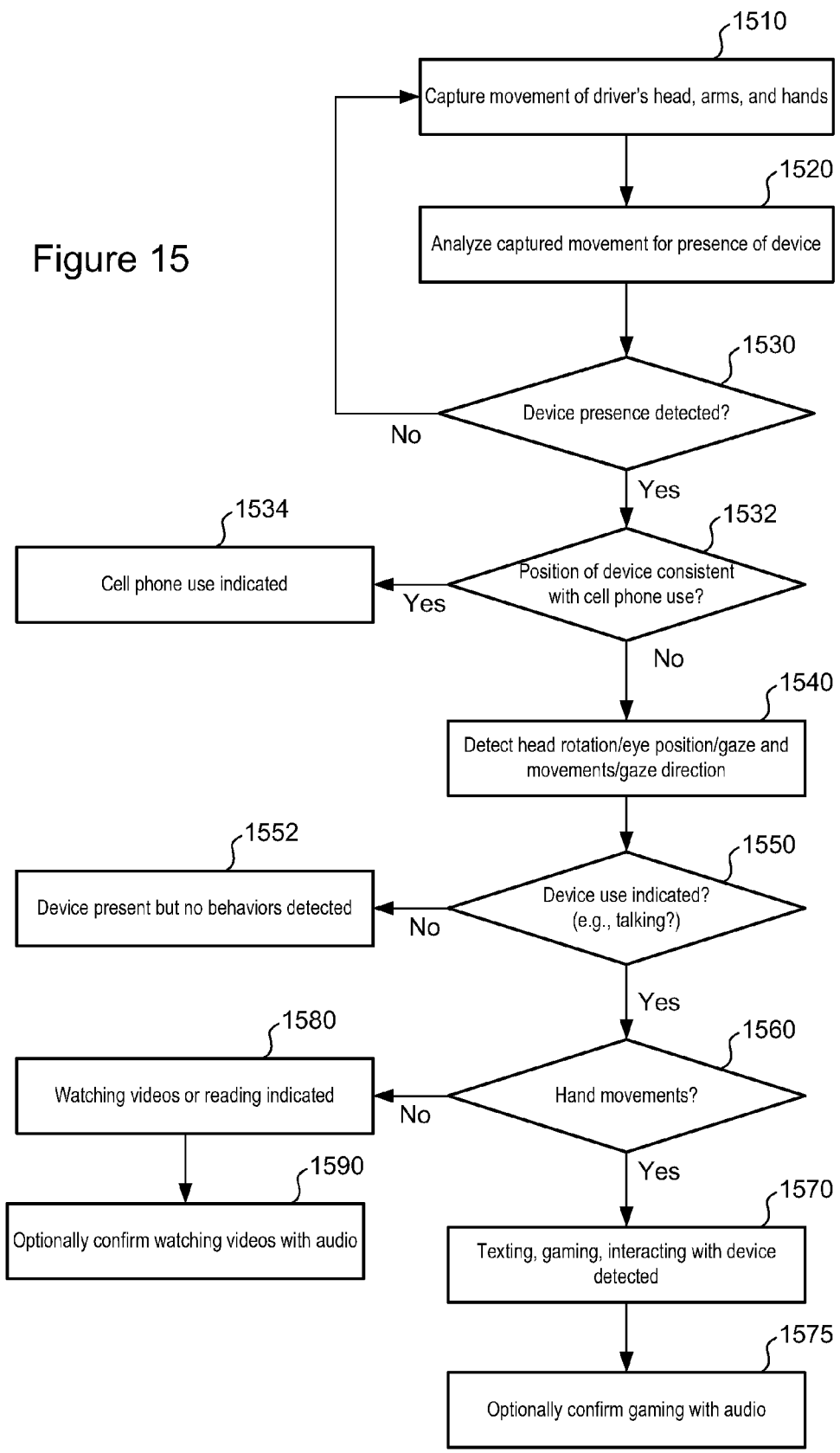
FIG. 15 is a flow diagram illustrating a method for identifying active driver behavior involving the use of a device, e.g., cell phone, tablet, computer, book, ebook and the like in accordance with various embodiments.

FIG. 15 is a flow diagram illustrating a method for identifying active driver behavior involving the use of a device, e.g., cell phone, tablet, computer, book, ebook and the like. Driver movements of the head, arms, and hands are captured 1510 by the driver movement sensor and analyzed 1520 for the presence of a device. The device may be recognized from the captured driver movements by template or model matching techniques, for example. A suitable approach for device recognition may be to search RGB camera images for straight edges of the device, and/or to determine pixel brightness that would indicate a display. The approach for determining the presence of a device may be different for dark conditions vs. daylight conditions.

In the illustrated example, if a device is detected 1530, the system optionally determines if the device position is consistent with 1532 non-hands free cell phone use. For example, the system may determine the position of the device in relation to the driver's head and/or may determine the position of the driver's hand relative to the device and head. For example, non-hands free cell phone use may be indicated 1534 if the device is within a predetermined distance from the driver's head, if the driver's hand is proximate to the device, and/or if the driver is talking, which can sensed by the in-cab microphone.

If the device position is not consistent with cell phone use, the system checks for 1540 one or more of head rotation, eye position, eye movements and/or gaze direction. If the head rotation, eye position, eye movements and/or gaze direction are inconsistent 1550 with device use, then the system determines 1552 that a device is present in the cab, however, the driver is not using the device. Determining if the driver is using a device based on head rotation, eye position, eye movements and/or gaze direction may be implemented, for example, using template or model comparison techniques or a data fusion technique with weighting factors and/or confidence coefficients as previously discussed.

If device use is indicated 1550, the system determines if hand movements consistent with some device usages are present 1560. If so, the driver is likely texting, gaming, or interacting 1570 with the device in a way that involves hand motions. The system may confirm 1575 behaviors such as gaming by determining if sounds indicating electronic gaming are detected.

If hand movements are not detected 1560, and device use is indicated 1550 by head or eye/retina movements/positions, etc., then the driver is likely to be watching videos or reading 1580. Behaviors that involve sound, such as video watching, may be confirmed 1590 based on audio data.

Figure 16:
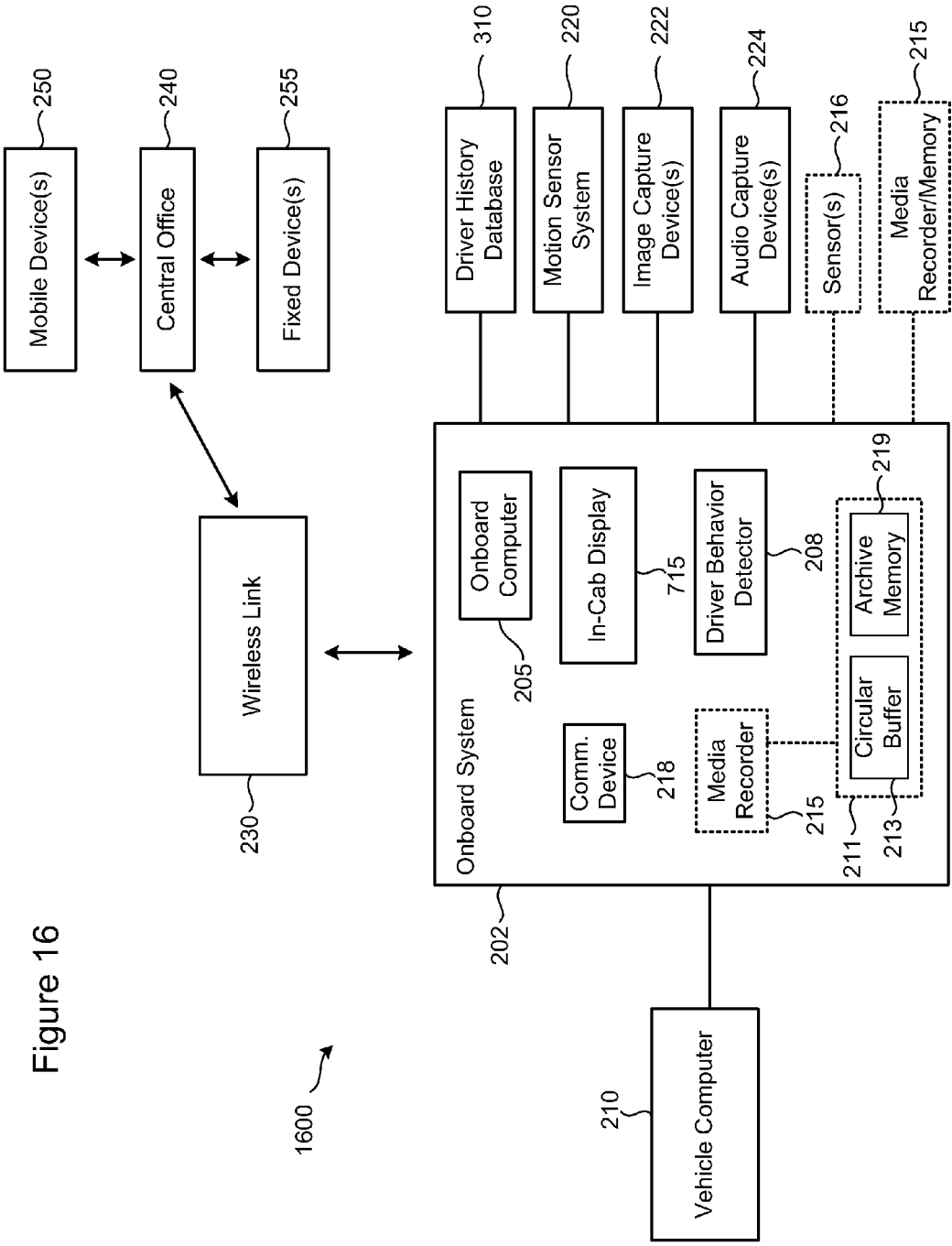
FIG. 16 is a block diagram of a system for acquiring and processing driver movement information which may be used for driver behavior identification in accordance with various embodiments.

FIG. 16 is a block diagram of a system 1600 for acquiring and processing driver movement information which may be used for driver behavior identification in accordance with various embodiments. According to the representative embodiment shown in FIG. 16, the system 1600 includes an onboard system 202 which is provided at the vehicle. As previously discussed, among various components, the onboard system 202 includes an onboard computer 205, an in-cab display 715, and a driver behavior detector 208. The onboard system 202 is communicatively coupled to a motion sensor system 220 of a type previously described hereinabove. The onboard system 202 is also communicatively coupled to a vehicle computer 210, and to a central office 240 via one or more communication links, such as a wireless link 230 via a communication device 218. The communication device 218 can be configured to facilitate over-the-air (OTA) programming and interrogation of the onboard system 202 by the central office 240 via the wireless link 230 and/or other links.

Connectivity between the onboard system 202 and the central office 240 may involve a number of different communication links, including cellular, satellite, Wi-Fi®, and land-based communication links. The central office 240 provides for connectivity between mobile devices 250 and/or fixed (e.g., desktop) devices 255 and one or more servers of the central office 240. The central office 240 can be an aggregation of communication and data servers, real-time cache servers, historical servers, etc. In one embodiment, the central office 240 includes a computing system that represents at least the communication/data servers and associated computing power needed to collect, aggregate, process and/or present the data, including driver movement data and optionally video data associated with vehicle or driver behavior events. The computing system of the central office 240 may be a single system or a distributed system, and may include media drives, such as hard and solid-state drives, CD-ROM drives, DVD drives, and other media capable of reading and/or storing information.

In some embodiments, the onboard system 202 incorporates a media recorder 215, such as a digital media recorder (DMR), a digital video recorder (DVR), or other multimedia storage device. In other embodiments, the onboard system 202 is communicatively coupled to a separate media recorder 215 via an appropriate communication interface. The media recorder 215 can include one or more memories of the same or different technology. For example, the media recorder 215 can include one or a combination of solid-state (e.g., flash), hard disk drive, optical, and hybrid memory (combination of solid-state and disk memories). Memory of the media recorder 215 can be non-volatile memory (e.g., flash, magnetic, optical, NRAM, MRAM, RRAM or ReRAM, FRAM, EEPROM) or a combination of non-volatile and volatile (e.g., DRAM or SRAM) memory.

Because the media recorder 215 is designed for use in a vehicle, the memory of the media recorder 215 is limited. As such, various known memory management techniques, such as that described below, can be employed to capture and preserve meaningful event-based data, including driver movement data.

The media recorder 215 is configured to receive and store at least driver movement data, and preferably other forms of media including video, still photographic, audio, and data from one or more sensors, among other forms of information. In addition, data produced by one or more image capture devices 212 (still or video cameras), one or more audio capture devices 214 (microphones or other acoustic transducers), and one or more sensors 216 (e.g., radar, infrared sensor, RF sensor or ultrasound sensor) can be communicated to the onboard system 202 and stored in the media recorder 215 and/or memory 211.

In addition to storing various forms of media data, the media recorder 215 can be configured to cooperate with the onboard computer 205 and/or the driver behavior detector 208 to process the various forms of data useful for identifying driver behaviors. The various forms of data stored on the media recorder 215 (and/or memory 211) can include driver movement data, video, still photography, audio, sensor data, and various forms of vehicle data acquired from the vehicle computer 210. In some implementations, the onboard computer 205 or other processor cooperates with the media recorder 215 to package disparate forms of event-related data for transmission to the central office 240 via the wireless link 230. The disparate forms of data may be packaged using a variety of techniques, including techniques involving one or more of encoding, formatting, compressing, interleaving, and integrating the data in a common or separate file structures.

According to some embodiments, the memory of the media recorder or other memory 211 (optional) of the onboard system 202 is configured to manage media and other data using a loop memory or circular buffer management approach, whereby data can be acquired in real-time and overwritten with subsequently captured data. In response to a predetermined event (e.g., triggered by driver movement data or vehicle/sensor data), the data associated with the event (data stored prior to, during, and after a detected event) can be transferred from a circular buffer 213 to archive memory 219 within a memory 211 of the onboard system 202. The archive memory 219 is preferably sufficiently large to store data for a large number of events, and is preferably non-volatile, long-term memory. The circular buffer 213 and archive memory 219 can be of the same or different technology. Archived data can be transmitted from the archive memory 219 to the central office 240 using different transfer strategies. For example, one approach can be based on lowest expected transmission cost, whereby transmission of archived data is delayed until such time as a reduced cost of data transmission can be realized, which can be based on one or more of location, time of day, carrier, required quality of service, and other factors. Another approach can be based on whether real-time (or near real-time) access to the onboard event data has been requested by the driver, the central office 240 or a client of the central office 240, in which case archive memory data is transmitted to the central office 240 as soon as possible, such as by using a data streaming technique.

A database 310 is communicatively accessible by the driver behavior detector 208 and stores driver history information which may be obtained from various external databases and/or data sources, e.g., central office personnel records, law enforcement databases, the vehicle computer 210, and/or the onboard computer 205, etc., and organized in the database as a driver history. For example, the driver history information may include, but is not limited to years of experience of the driver, certifications and/or education of the driver, type of experience (e.g., what types of vehicles the driver has experience driving), history and details of traffic accidents, driver profile, items from an employment personnel record, medical history, prescribed pharmaceuticals, history of speeding and/or other traffic violations, number and/or length of previously identified occurrences of various driver behaviors.

Figure 17:
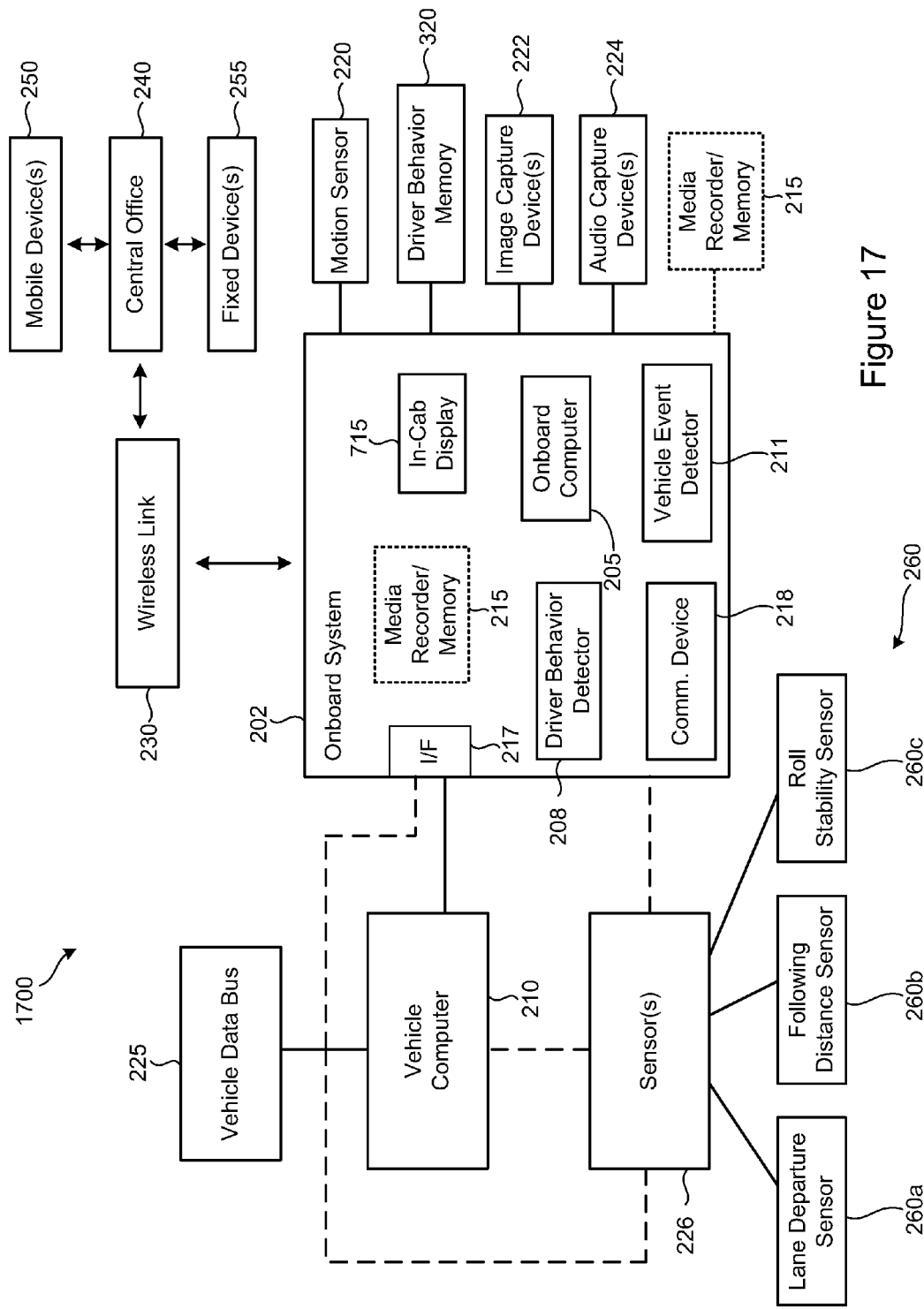
FIG. 17 is a block diagram of a system for acquiring and processing driver movement information which may be used for driver behavior identification in accordance with various embodiments.

FIG. 17 is a block diagram of a system 1700 for acquiring and processing driver movement information which may be used for driver behavior identification in accordance with various embodiments. In the representative embodiment shown in FIG. 17, the system 1700 includes an onboard system 202 communicatively coupled to a vehicle computer 210 via an interface 217 and to a central office 240 via a wireless link 230 (and possibly other links). The central office 240 is coupled to the onboard system 202 via a cellular link, satellite link and/or a land-based link, and can be communicatively coupled to various mobile entities 250 and fixed devices 255. The onboard system 202 includes an in-cab display 715, an onboard computer 205, driver behavior detector 208 (which in some embodiments may comprise the processor of the onboard computer 205 running driver behavior detection software), vehicle event detector 211, and a communications device 218. The onboard system 202 incorporates a media recorder 215 or, alternatively or in addition, is coupled to a separate media recorder 215 or memory system via an appropriate communication interface. In some embodiments, information acquired by the vehicle event detector 211 is obtained from the vehicle computer 210 via the interface 217, while in other embodiments the onboard system 202 is coupled to the vehicle data bus 225 or to both the vehicle computer 210 and data bus 225, from which the needed information is acquired for the vehicle event detector 211. In further embodiments, the vehicle event detector 211 operates on data received from the central office 240, such as information stored in a transportation management system supported at or coupled to the central office 240.

According to the embodiment shown in FIG. 17, a variety of vehicle sensors 226, 260 are coupled to one or both of the onboard system 202 and/or the vehicle computer 210, such as via the vehicle data bus 225. A representative, non-exhaustive listing of useful vehicle sensors 226, 260 include a lane departure sensor 260a (e.g., a lane departure warning and forward collision warning system), a following distance sensor 260b (e.g., a collision avoidance system), and a roll stability sensor 260c (e.g., an electronic stability control system). Representative lane departure warning and forward collision warning systems include Mobileye—5 Series, Takata—SAFETRAK, and Bendix—SAFETYDIRECT. Representative electronic stability control systems include Bendix—(ESP) Electronic Stability Program, and Meritor—(RSC) Roll Stability Control. Representative collision avoidance systems include Bendix—WINGMAN and Merito—ONGUARD. Each of these sensors 260a, 260b, 260c or sensor systems is shown respectively coupled to the vehicle computer 210 and/or the vehicle data bus 225. In some embodiments, one or more of the vehicle sensors 226, 260 can be directly coupled to the onboard system 202.

According to various embodiments, the event detector 211 includes a trip recorder that may be implemented as a software program executable by the onboard computer 205.

In some embodiments, the trip recorder collects various types of vehicle and/or sensor data, and compares the collected data with various thresholds to determine if a vehicle event has occurred. In some embodiments, the trip recorder may detect a driving event (triggered by vehicle and/or sensor data) and the driver movement system (driver movements) may be used to corroborate the driving event indicated by the trip recorder. For example, the trip recorder can collect one or more of vehicle data from the vehicle computer 210, sensor data from one or more vehicle sensors 226, 260 image and audio data from one or more image and audio capture devices 222, 224, and data acquired from a transport management system via the central office 240. The vehicle event detector 211 analyzes the data acquired by the trip recorder for possible violation of one or more predetermined event parameter violations. Before declaring an actual violation of one or more predetermined driving event parameter violations, the vehicle event detector 211 interrogates the driver movement system to determine if captured driver movement data is consistent or inconsistent with the possible violation of a predetermined driving event parameter. In other embodiments, the driver movement system may detect a driving event (triggered by driver movements indicating a distracted driver event) and the trip recorder may be used to corroborate the driving event indicated by the driver movement system.

The vehicle data collected by the trip recorder can include sudden acceleration, sudden deceleration, vehicle fault codes (safety related codes, codes indicative of onerous repair costs), shifting behavior data (engine RPM versus speed for evaluating shifting behavior), and electronic driver log data. Other vehicle can be collected by the trip recorder, including vehicle electronic control module (ECM) data (e.g., ECM emissions, fuel, air, speed, fluid pressures, and temperatures) and vehicle fault codes. The sensor data collected by the trip recorder can include roll stability, lane departure, following distance, tire pressure and tire pressure exception data, refrigeration system (e.g., fuel, temperature), trailer information system, seatbelt usage, ambient temperature, GPS, heading, and date/time. Video and still image data from one or more image capture devices 222 and audio data from one or more audio capture devices 224 can be collected by the trip recorder. Various types of TMS data can be collected by the trip recorder (or other device in the vehicle), including driver ID and certification data, driver HOS status and CSA scoring data, cargo or load information (e.g., hazmat data, value, weight, volume, special handling requirements), route and mapping information (e.g., bridge clearance, hazmat restrictions, road conditions), fuel stop scheduling, and vehicle maintenance and equipment information.

Thresholds for each of these representative event parameters can be established and/or modified by an authorized user of the onboard system 202, such as a fleet owner, during system installation and/or during operation by way of the central office 240. Thresholds for driver movements considered suspect/inappropriate and, in some embodiments, those considered to be appropriate/acceptable, can be established and/or modified by an authorized user of the onboard system 202, such as a fleet owner, during system installation and/or during operation by way of the central office 240. The vehicle event detector 211 can be configured to analyze the various vehicle computer data, sensor data, image and audio data, TMS data, driver movement data, and other data to determine if a threshold associated with any of the predetermined established vehicle event parameters or driver movement parameters has been exceeded. If so, the vehicle event detector 211 declares an event violation and, in response, vehicle alert data is transmitted from the onboard system 202 to one or both of an output device in the cab (e.g., display, lights, speaker, vibratory element) and the central office 240 via the communications device 218. The vehicle alert data can include a variety of data surrounding the vehicle event, for example, a predetermined amount of data prior to and after the declared vehicle event can be collected and transmitted as vehicle alert data to the central office 240.

Some embodiments described herein involve the use of images to enhance various aspects of cargo transport. The images may comprise still or video images captured using cameras located in various positions in, on, and/or around a vehicle. The use of one or more of types of images to enhance vehicle operation, driver behavior, and/or to inform management of cargo and cargo vehicles is referred to herein as "image intelligence." Embodiments discussed hereinbelow involve the use of captured images to identify various types of driver behaviors including fatigue-related behaviors and active behaviors including those active behaviors that include interaction by the driver with a device, such as an electronic device, e.g., cellphone, tablet, laptop computer, ebook reader, or a non-electronic device, such as a book, magazine, or newspaper.

Figure 18:
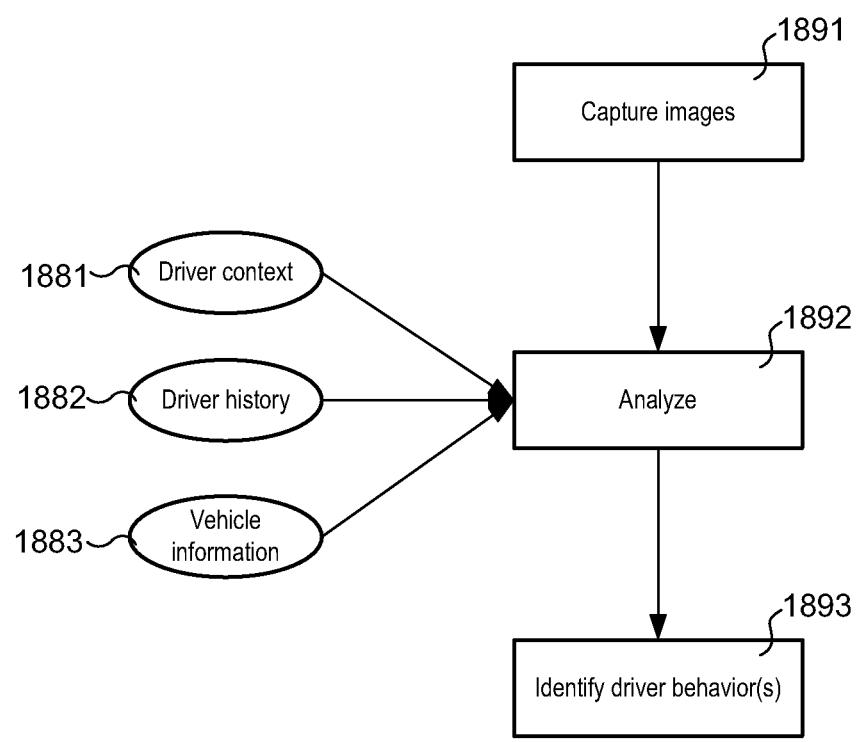
FIG. 18 is a conceptual diagram of an approach for identifying driver behaviors based on captured images according to various embodiments.

FIG. 18 is a conceptual diagram of an approach for identifying driver behaviors based on captured images. In some embodiments, images of a driver are captured 1891 using one or more video and/or still cameras that may be positioned in the cab of a vehicle or in other locations. In some implementations, at least some of the cameras are positioned to capture images of the interior of the cab, images of areas within view of the driver, images of the driver's head and face, the driver's torso, and/or the driver's limbs and hands. In some embodiments, the images are analyzed 1892 in conjunction with additional information that may include, but is not limited to, driver context 1881, driver history 1882, and/or vehicle information 1883, examples of which are provided hereinabove. The additional information may be acquired from a remote system, such as one that supports or is communicatively coupled to a transportation management system (TMS), or a multiplicity of remote systems or sources.

The captured images are analyzed in conjunction with the additional information to identify 1893 one or more driver behaviors. The captured images are analyzed and driver behavior identified by a driver behavior detector. As was discussed previously, the driver behavior detector may comprise hardware running software and/or firmware configured to implement driver behavior detection. In some embodiments, the driver behavior detector may be implemented as part of an onboard computer of a vehicle, in some embodiments the captured images and/or a least some of the additional information is transmitted from the vehicle to an external computer, e.g., the central office processor or TMS processor, which analyzes the captured images in conjunction with the additional data to identify driver behaviors. In some embodiments, some portions of driver behavior detection, such as images processing and/or pattern recognition, may be implemented by the vehicle's onboard system and some portions of the driver behavior detector such as analysis of the processed image data in conjunction with additional data, may be implemented by an external processor.

Figure 19:
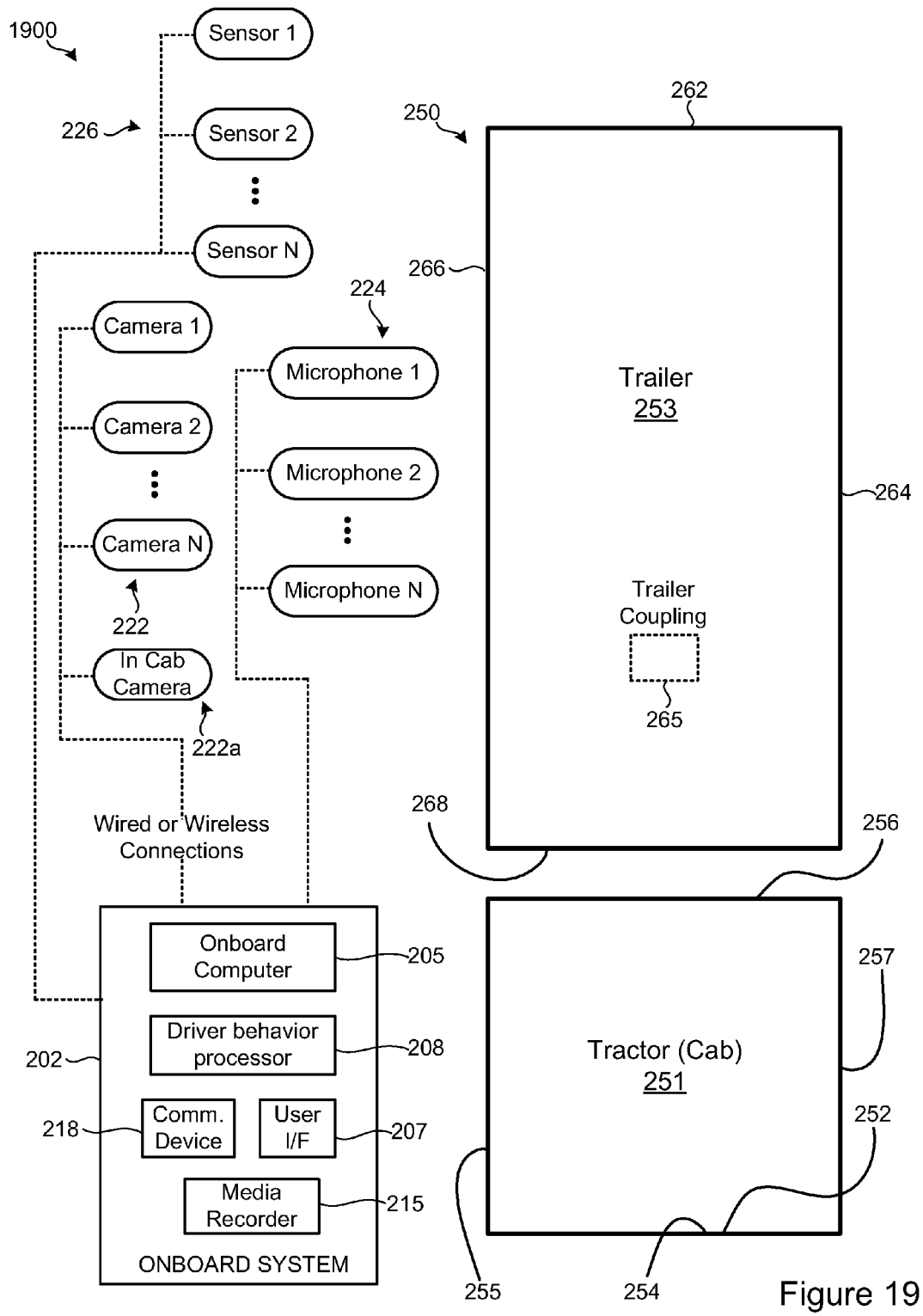
FIG. 19 is a block diagram of an apparatus for implementing image intelligence to determine driver behavior in accordance with various embodiments.

FIG. 19 is a block diagram of an apparatus 1900 for implementing image intelligence to determine driver behavior in accordance with various embodiments. The apparatus 1900 may be deployed on a vehicle 250 comprising a tractor 251 and a trailer 253 on which various electronic components are respectively mounted. The electronic components include an onboard system 202 which is preferably mounted in the tractor 251 of the vehicle 250. The onboard system 202 is shown to include an onboard computer 205 (a microprocessor, controller, reduced instruction set computer (RISC), or other central processing module), a user interface 207, and optionally includes a driver behavior detector 208. The user interface 207 includes one or more output devices and/or one or more input devices configured for interaction with an operator, examples of which are described hereinabove. The onboard system further comprises a communication device 218, and a media recorder 215. The onboard system includes a memory, which may be integral or coupled to a processor of the onboard computer 205, can store firmware, executable software, and algorithms, and may further comprise or be coupled to a subscriber interface module (SIM), wireless interface module (WIM), smart card, or other fixed or removable memory device/media.

The electronic components further include one or more cameras 222 (in some embodiments including in-cab cameras 222*a*), one or more microphones 224 (at least one may be located in the cab), and one or more sensors 226. The cameras 222, microphones 224, and sensors 226 are communicatively coupled to the onboard system 202 via wired or wireless connections. It is understood that a given vehicle 250 may be equipped with some, but not necessarily all, of the data acquisition devices shown in FIG. 19 and that other data acquisition devices can be mounted to the vehicle 250.

The various data acquisition devices illustrated in FIG. 19 can be mounted at different locations in, on, and/or around the trailer 253 and tractor 251 of the vehicle 250. All locations on the interior and exterior surfaces of the trailer 253 and tractor 251 are contemplated. In some embodiments, the tractor 251 includes a cab in which one or more in-cab cameras 222*a* and optionally microphones 224 and sensors 226 are mounted. For example, one or more first in-cab cameras 222*a* can be mounted on the dashboard 252 or rearview mirror 254 (or elsewhere) and directed outwardly in a forward-looking direction to monitor the roadway ahead of the tractor 251. One or more second in-cab cameras 222*a* can be mounted on the dashboard 252 or rearview mirror 254 (or elsewhere) and directed toward the driver and/or passenger within the cab of the tractor 251. In some implementations, the second in-cab camera 222*a* can be directed toward the driver, while a third in-cab camera 222*a* can be directed toward the passenger portion of the cab of the tractor 251. At least some of the in-cab cameras 222*a* may be mounted so that their field of view includes one or more of the driver's head, driver's face, driver's torso, driver's limbs. In some embodiments, the driver behavior detector 208 or other component may be configured to change the field of view and/or focus of at least the in-cab cameras 222*a* to facilitate capturing images to identify driver behaviors.

The tractor 251 can include one or more exterior cameras 222, microphones 224, and/or sensors 226 according to various embodiments, such as a camera 222 mounted on a left side 257, a right side 255, and/or a rear side 256 of the tractor 251. The exterior cameras 222 can be mounted at the same or different heights relative to the top or bottom of the tractor 251. Moreover, more than one camera 222 can be mounted on the left side 257, right side 255 or rear side 256 of the tractor 251. For example, single or multiple (e.g., stereoscopic) left and right side cameras 222 can be mounted rearward of the left and/or right doors of the tractor 251 or, alternatively, the near or on the left and/or right side mirror assemblies of the tractor 251. A first rear camera 222 can be mounted high on the rear side 256 of the tractor 251, while a lower rear camera 222 can be mounted at or near the hitch area of the tractor 251.

The trailer 253 can include any number of cameras 222 positioned in or on the various surfaces of the trailer 253. For example, a single or multiple (e.g., stereoscopic) cameras 222 can be positioned on a rear surface 262 of the trailer 253, allowing for driver viewing in a rearward direction of the vehicle 250. One or more cameras 222 can be positioned on a left and a right side surface 264 and 266 of the trailer 253, allowing for driver viewing in a rearward and/or lateral direction of the vehicle 250. One or more cameras 222 may be positioned on the front surface of the trailer 253, such as at a lower position to facilitate viewing of the hitch area and hose/conduit connections between the trailer 253 and the tractor 251. A camera 222 may also be situated at or near the trailer coupling location 265 or at or near other locations along the lower surface of the trailer 253, such as near fuel hoses and other sensitive components of the trailer 253.

Figure 20:
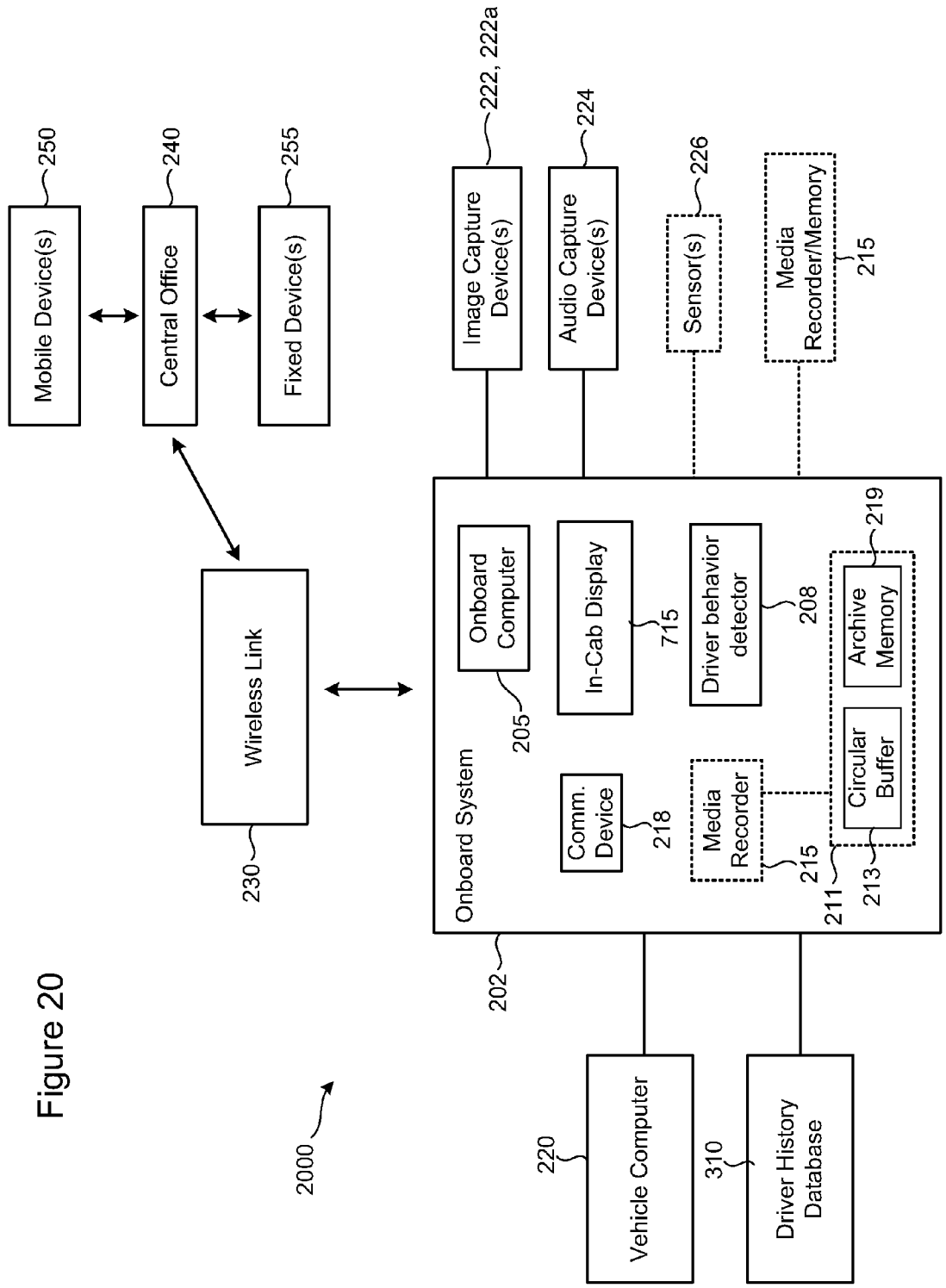
FIG. 20 is a block diagram of a system for acquiring and processing video information which may be used for identifying driver behaviors in accordance with various embodiments.

FIG. 20 is a block diagram of a system 2000 for acquiring and processing video information which may be used for driver behavior identification in accordance with various embodiments. The system 2000 shown in FIG. 20 is similar to that illustrated in FIG. 16, the notable exception being the lack of a motion sensor 220 in the embodiment of FIG. 20. It can be assumed that the system 2000 shown in FIG. 20 operates similarly to system 1600 of FIG. 16, and processes image data rather than motion sensor data.

Figure 21:
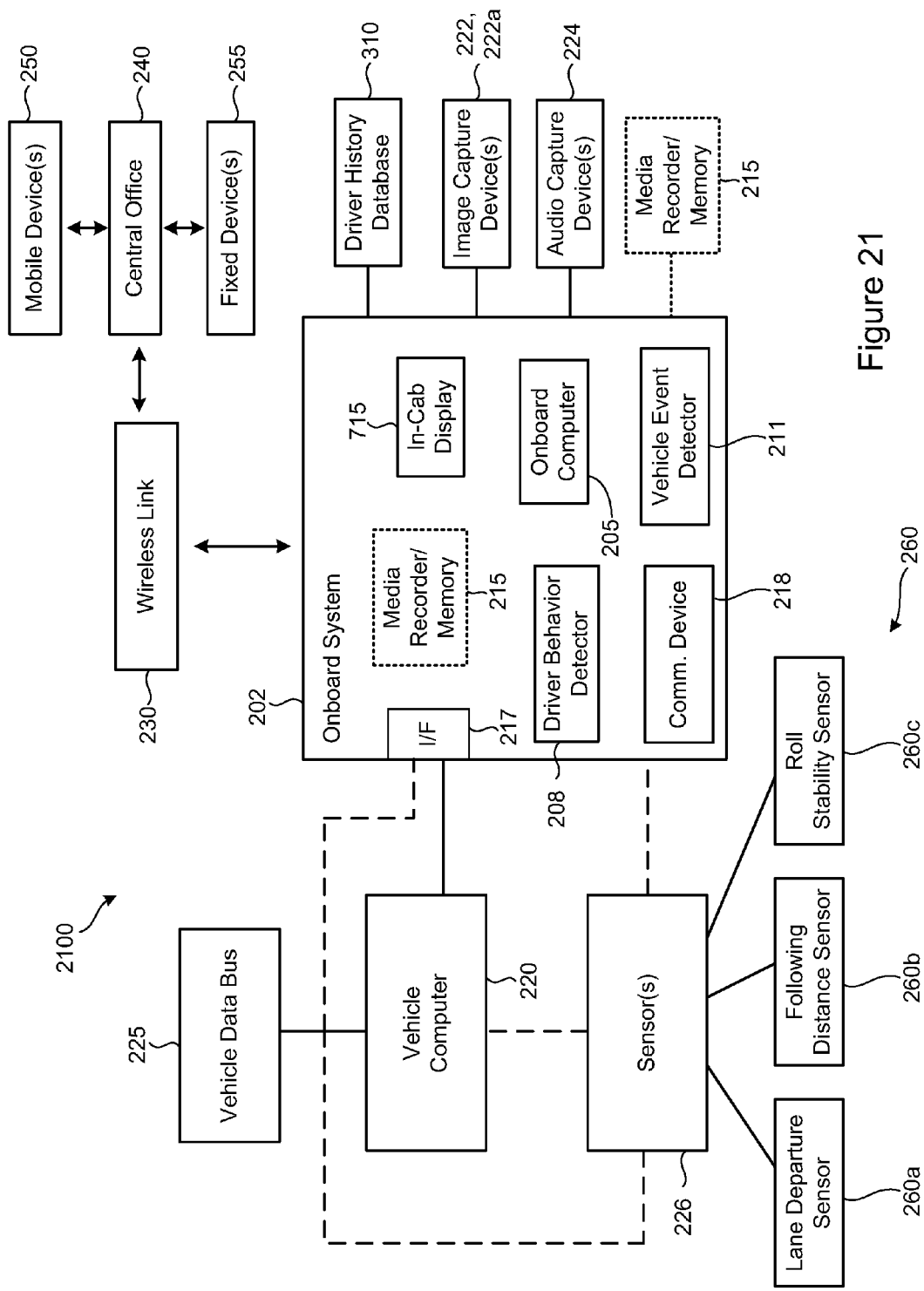
FIG. 21 is a block diagram of a system for acquiring and processing image information and identifying driver behaviors in accordance with various embodiments.

FIG. 21 is a block diagram of a system 2100 for acquiring and processing image information and identifying driver behavior in accordance with various embodiments. The system 2100 shown in FIG. 21 is similar to that illustrated in FIG. 17, the notable exception being the lack of a motion sensor 220 in the embodiment of FIG. 21 and the addition of a driver history database 310. It can be assumed that the system 2100 shown in FIG. 21 operates similarly to system 1700 of FIG. 17, and processes image data rather than motion sensor data.

Figure 22:
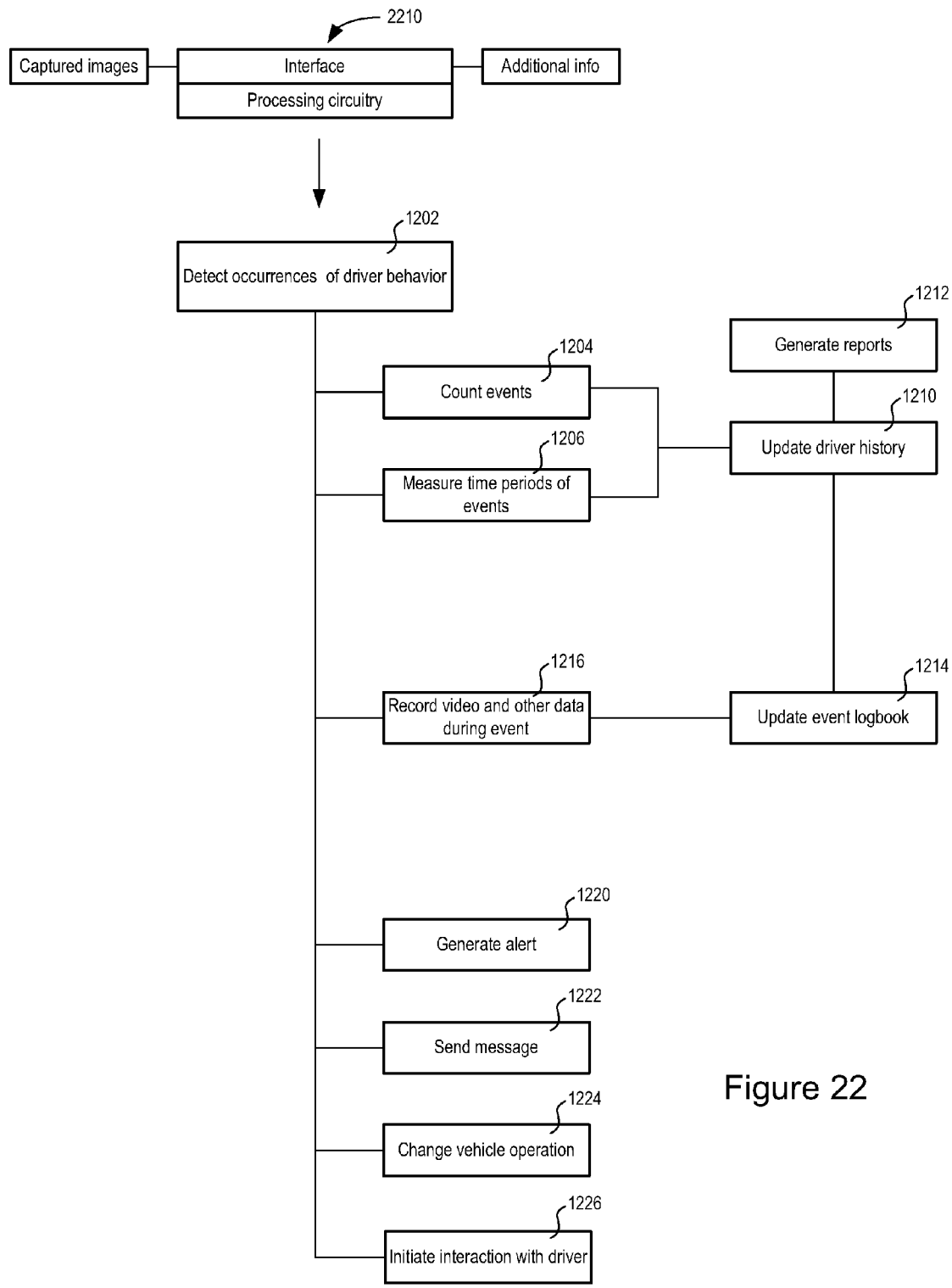
FIG. 22 is a diagram that conceptually illustrates operation of a system in accordance with various embodiments.

FIG. 22 is a diagram that conceptually illustrates operation of system that includes driver behavior detection in accordance with various embodiments. The system includes a driver behavior detector 2210 configured to detect occurrences of a set of driver behaviors based on captured images of the driver and optionally captured images of an area surrounding the driver, wherein the captured images are analyzed in conjunction with additional information. The diagram shown in FIG. 22 is similar to that illustrated in FIG. 12, the notable exception being the capturing of driver images in FIG. 22 rather than driver movements as is shown in FIG. 12. It can be assumed that the processes shown in FIG. 22 are similar to those described in the context of FIG. 12, except that image data is processed rather than motion sensor data.

Figure 23:
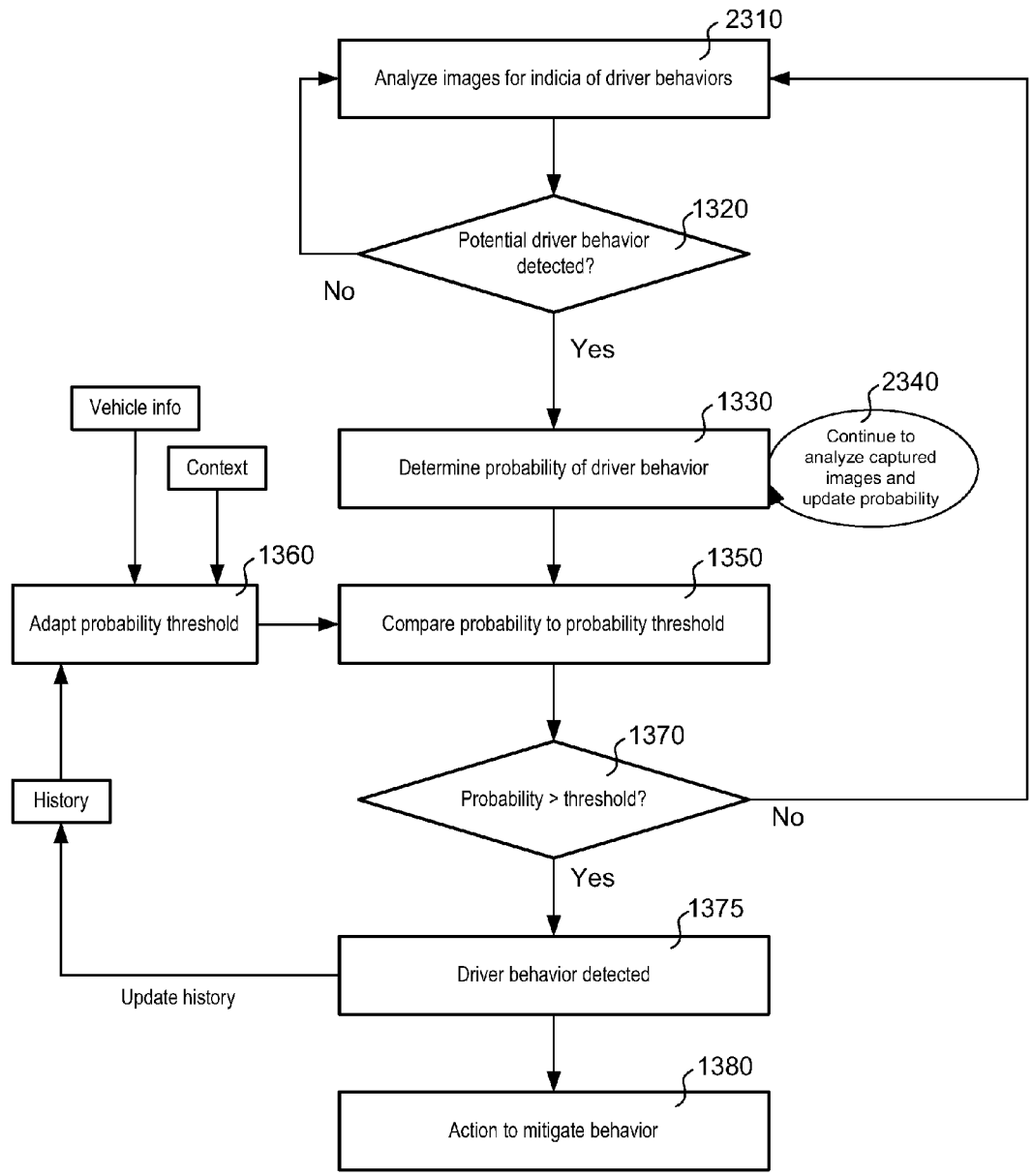
FIG. 23 is a flow diagram illustrating a method of identifying and responding to driver behaviors in accordance with various embodiments.

FIG. 23 is a flow diagram illustrating a method of identifying driver behaviors in accordance with various embodiments. Captured images and/or image sequences are continuously or periodically analyzed 2310 for evidence of one or more driver behavior events of interest. Evidence of a driver behavior event of interest in images can include, for example, images and/or images sequences that show an electronic device in view of the driver, driver positions and/or movements associated with the driver behaviors of interest. The driver movements may be head movements, e.g., head rotation downward or toward an electronic device, facial movements, gaze direction, e.g., eyes looking away from the road and/or toward the electronic device, torso movements and/or limb/hand movements, e.g., movements associated with gaming or texting.

The processes shown in FIG. 23 are similar to those illustrated in FIG. 13, with the exception that image data, rather than motion sensor data, is processed in FIG. 23 (see, e.g., processes 2310 and 2340). It can be assumed that the processes shown in FIG. 23 are similar to those described in the context of FIG. 13, except that image data is processed rather than motion sensor data. Driver behaviors may be identified using analysis of images from one or more video cameras according to FIG. 23 to detect certain movements and/or positions of the driver and to detect the presence of an object, e.g., a computer, cell phone, gaming device, book, magazine, ebook reader, etc.

Approaches for detecting driver behaviors can be categorized into non-parametric approaches, volumetric approaches, and parametric approaches. Non-parametric detection extracts features from each frame of a video and attempts to match the trajectory of the extracted features over time to a template representative of a particular driver behavior. For example, the features extracted may comprise joints (wrist joints, finger joints) or facial features (lip corners, eye lid edges, eye pupils). If the trajectory of the feature points is sufficiently correlated to the template, the driver behavior detector indicates that a movement associated with a particular driver behavior has been detected.

A video is a sequence of two dimensional XY images over time. Space-time volumes for driver behavior detection can comprise three dimensional XYT volumes formed by concatenating the two dimensional XY video images along the time axis, T. Volumetric approaches to driver behavior detection compare the space-time volumes of video images to template, e.g., without extracting features.

Parametric approaches to driver behavior detection use a model, e.g., a statistical state-based model, such as a hidden Markov model and/or dynamic Bayesian network, for a particular behavior. The probability of the model generating an observed sequence of feature vectors can be calculated to detect driver behaviors.

Figure 24:
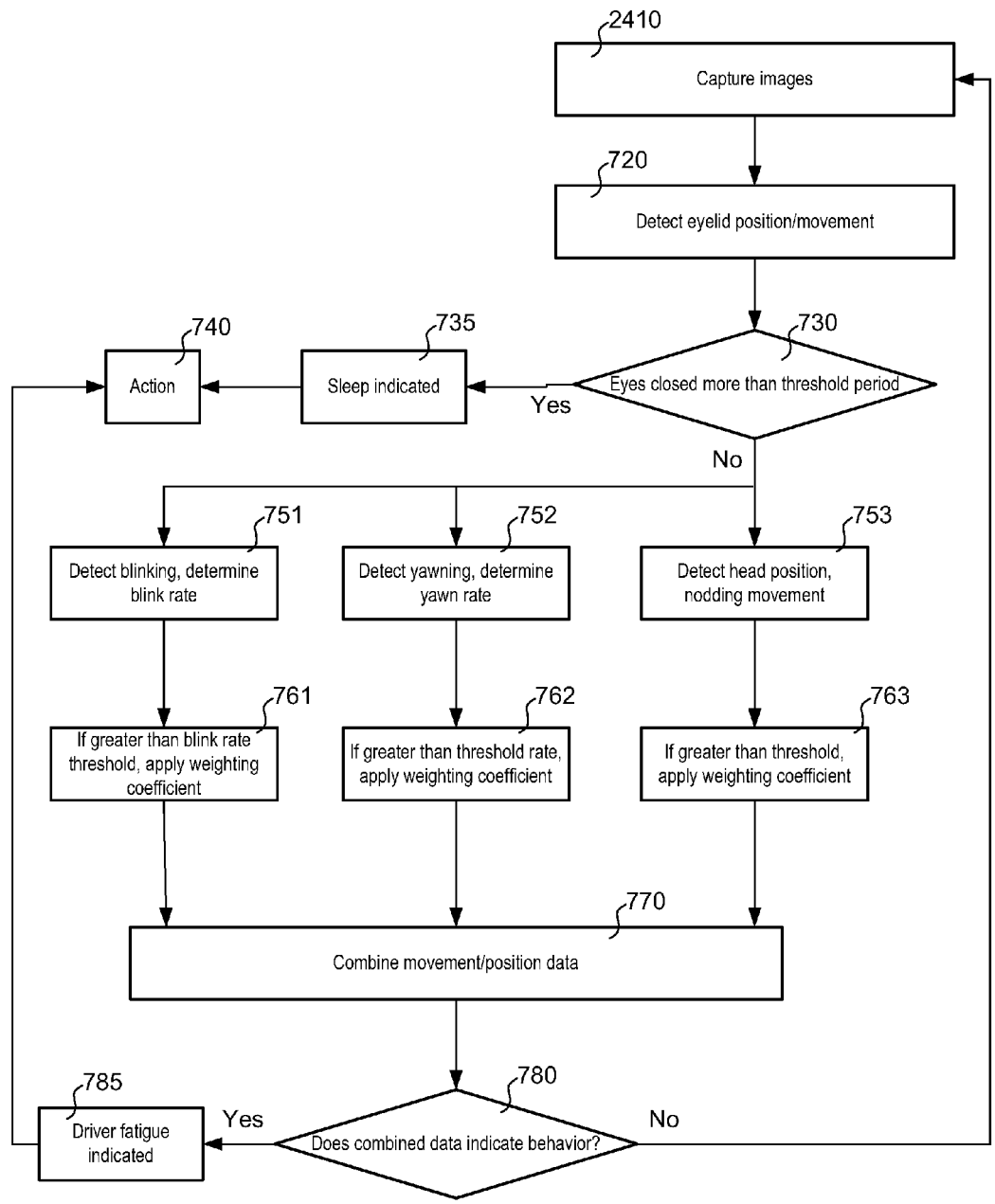
FIG. 24 is a flow diagram illustrating a process of detecting and responding to fatigue/sleep related driver behaviors in accordance with some embodiments.

FIG. 24 is a flow diagram illustrating a process of detecting and responding to fatigue/sleep-related driver behaviors using a data fusion approach based on captured images from one or more cameras in the cab. The processes shown in FIG. 24 are similar to those illustrated in FIG. 14, with the exception that image data (e.g., process 2410), rather than motion sensor data, is processed in FIG. 24. It can be assumed that the processes shown in FIG. 24 are similar to those described in the context of FIG. 14, except that image data is processed rather than motion sensor data.

Figure 25:
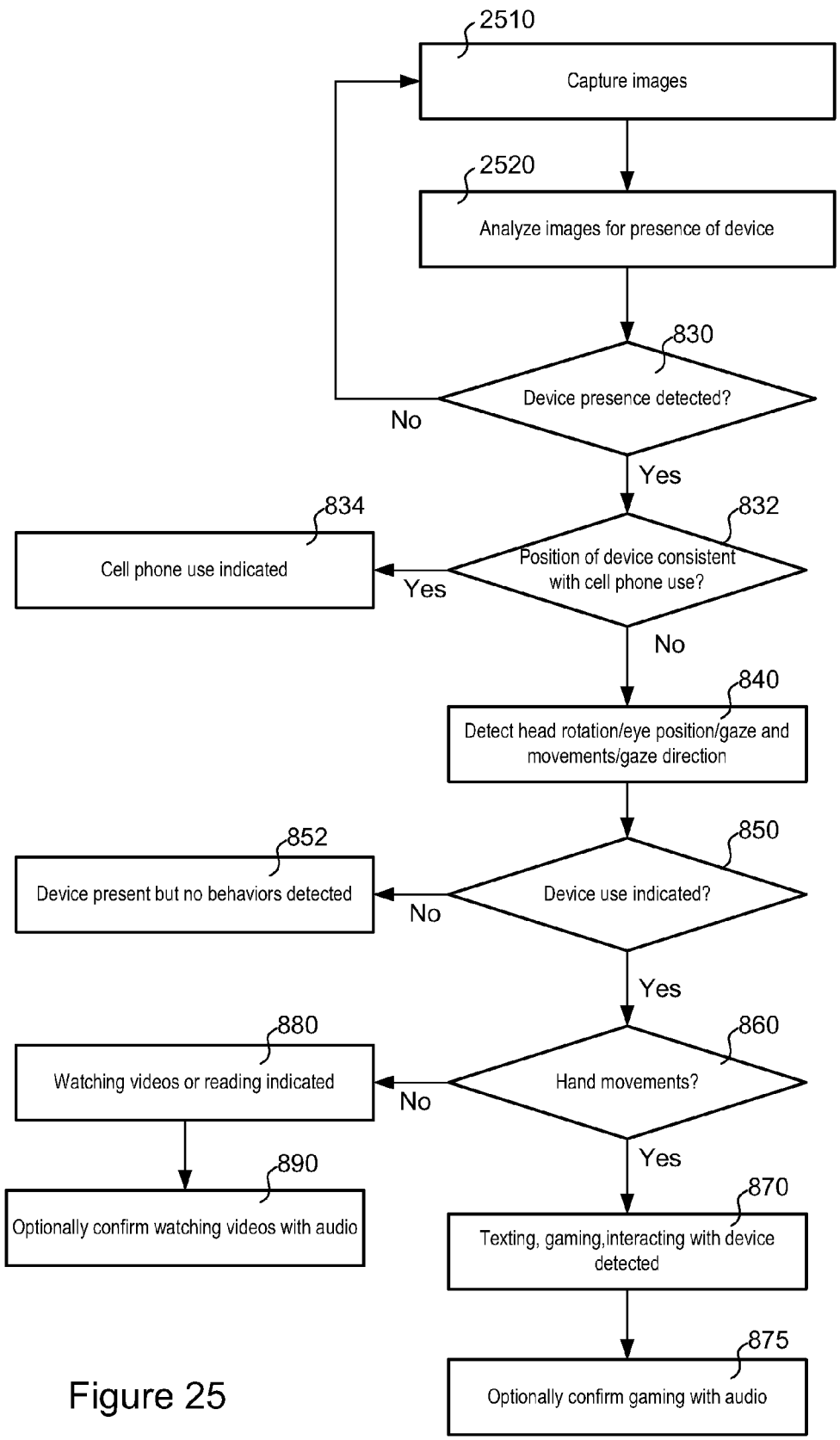
FIG. 25 is a flow diagram illustrating a method for identifying active driver behaviors involving the use of an electronic or other type of device in accordance with some embodiments.

FIG. 25 is a flow diagram illustrating a method for identifying active driver behavior involving the use of a device, e.g., cell phone, tablet, computer, book, ebook and the like. Images are captured 2510 by one or more video cameras and are analyzed 2520 for the presence of a device. The device may be recognized from the captured video images by template matching, for example. A suitable approach for device recognition may be to search the video images for straight edges of the device, and/or to determine pixel brightness that would indicate a display. The approach for determining the presence of a device may be different for dark conditions vs. daylight conditions. The processes shown in FIG. 25 are similar to those illustrated in FIG. 15, with the exception that image data, rather than motion sensor data, is processed in FIG. 25. It can be assumed that the processes shown in FIG. 25 are similar to those described in the context of FIG. 15, except that image data is processed rather than motion sensor data.

Hardware, firmware, software or a combination thereof may be used to perform the functions and operations described herein. Using the foregoing specification, some embodiments of the disclosure may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium," "computer program product," or other analogous language are intended to encompass a computer program existing permanently, temporarily, or transitorily on any computer-usable medium such as on any memory device or in any transmitting device. From the description provided herein, those skilled in the art are readily able to combine software created as described with appropriate general purpose or special purpose computer hardware to create a computing system and/or computing subcomponents embodying various implementations of the disclosure, and to create a computing system(s) and/or computing subcomponents for carrying out the method embodiments of the disclosure.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed

What is claimed is:

1. A system, comprising:
   a motion sensor system configured for deployment in a cab of a vehicle operated by a driver and to generate substantially in real-time a digital mapping of driver movement using structured light during operation of the vehicle, the motion sensor system configured to compute a depth map of a portion of the driver's body using the structured light;
   an audio sensor configured for deployment in the cab and configured to generate an audio signal responsive to driver movement during operation of the vehicle, the audio sensor configured to operate in a listening mode;
   a computer configured for deployment in the cab and coupled to the motion sensor system and the audio sensor, the computer configured to generate a trigger signal in response to an output of the audio sensor while operating in the listening mode;
   a driver behavior detector coupled to the computer and configured to detect a driver distraction event using the driver movement mapping and the audio signal; and
   a communication device at the vehicle and configured to communicate an alert message to one or both of a user interface device in the cab and a remote system in response to the detected driver distraction event;
   wherein the motion sensor system is configured to generate substantially in real-time the digital mapping of the driver's face in response to the trigger signal.

2. The system of claim 1, wherein the motion sensor system comprises a three-dimensional motion sensor configured to generate substantially in real-time the digital mapping of the driver's movement.

3. The system of claim 1, wherein the motion sensor system comprises:
   an infrared projector or emitter;
   an infrared sensor; and
   a camera.

4. The system of claim 3, wherein the camera comprises an RGB color camera.

5. The system of claim 1, wherein the audio sensor comprises a multi-array microphone.

6. The system of claim 1, wherein the computer is configured to:
   detect a potential driver distraction event using the digital mapping; and
   determine that the potential driver distraction event is an actual driver distraction event using the audio signal.

7. The system of claim 6, wherein the computer is configured to determine a contextual characteristic of the audio signal, and determine if the contextual characteristic is consistent with distracted driver activity.

8. The system of claim 1, wherein the motion sensor system is configured to generate a three-dimensional contour or skeletal outline of the driver's face.

9. The system of claim 1, wherein:
   the motion sensor system is configured to detect changes of a retina of the driver; and
   the computer is configured to detect the driver distraction event using detected changes of the driver's retina.

10. The system of claim 1, wherein the alert message communicated to the remote system comprises an informational message devoid of photographic or video data.

11. The system of claim 1, wherein the alert message communicated to the remote system comprises an informational message and at least some facial mapping data.

12. The system of claim 1, further comprising an event detector configured to detect vehicle events based on one or both of vehicle computer or bus data and one or more sensors mounted at the vehicle, wherein:
   the computer is configured to detect the driver distraction event using the facial mapping, the audio signal, and an output produced by the event detector.

13. The system of claim 1, further comprising a forward-looking motion sensor system configured for deployment in the cab and configured to sense substantially in real-time movement of a person located in front of the vehicle while the vehicle is in park.

14. The system of claim 1, wherein:
   output from at least the motion sensor system is stored in a memory deployed at the cab; and
   the computer is configured to develop a profile or model for a specific driver of the vehicle using at least the stored motion sensor system output.

15. The system of claim 14, wherein the computer is configured to refine the profile or model for the specific driver in response to acquisition of data subsequently generated by one or both of the motion sensor system and the driver behavior detector.

16. The system of claim 1, wherein the computer is configured to:
   access, from an in-cab memory, an expected behavior profile or model developed from previously acquired digital mappings of the driver's movements; and
   compare the digital mapping of driver movement to the expected behavior profile or model to determine whether a potential driver distraction event is an actual driver distraction event.

17. The system of claim 1, wherein the computer is configured to:
compare the digital mapping of driver movement to an expected behavior profile or model developed from previously acquired digital mappings of the driver's movements;
count repeated occurrences where the digital mapping of driver movement matches the expected behavior profile or model;
compare the count to a threshold; and
determine that a potential driver distraction event is an actual driver distraction event in response to the count meeting or exceeding the threshold.

18. The system of claim 1, wherein the computer is configured to:
compare the digital mapping of driver movement to an expected behavior profile or model developed from previously acquired digital mappings of the driver's movements;
measure the duration of repeated occurrences where the digital mapping of driver movement matches the expected behavior profile or model;
compare the measured duration to a threshold; and
determine that a potential driver distraction event is an actual driver distraction event in response to the measured duration meeting or exceeding the threshold.

19. The system of claim 1, wherein the driver behavior detector is configured to:
receive additional data comprising one or more of vehicle computer data, vehicle sensor data, and environmental data; and
detect a driver distraction event using the driver movement mapping, the audio signal, and the additional data.

20. A system, comprising:
an imaging system configured for deployment in a cab of a vehicle operated by a driver and to generate substantially in real-time a digital image of driver movement during operation of the vehicle using structured light, the imaging system configured to compute a depth map of a portion of the driver's body using the structured light;
an audio sensor configured for deployment in the cab and configured to generate an audio signal responsive to driver movement during operation of the vehicle, the audio sensor configured for operation in a listening mode and to generate a trigger signal in response to detection of audio signals indicative of suspect driver behavior;
a computer configured for deployment in the cab and coupled to the imaging system and the audio sensor, the computer configured to cause the imaging system to generate the digital image of driver movement in response to the trigger signal;
a driver behavior detector coupled to the computer and configured to detect a driver distraction event using the driver movement image and the audio signal; and
a communication device at the vehicle and configured to communicate an alert message to one or both of a user interface device in the cab and a remote system in response to the detected driver distraction event.

21. A method, comprising:
generating substantially in real-time a digital mapping of driver movement using structured light during operation of a vehicle, wherein generating the digital mapping comprises computing a depth map of a portion of the driver's body using the structured light;
generating audio signals responsive to driver movement during operation of the vehicle;
generating, in a listening mode, a trigger signal in response to detecting an audio signal indicative of suspect driver behavior;
detecting a driver distraction event using the driver movement mapping and the audio signals; and
communicating an alert message to one or both of a user interface device in the vehicle and a remote system in response to the detected driver distraction event;
wherein the digital mapping of the driver's face is generated substantially in real-time in response to the trigger signal.

* * * * *